(12) United States Patent
Dini et al.

(10) Patent No.: US 9,247,388 B2
(45) Date of Patent: Jan. 26, 2016

(54) COOPERATIVE LOCALIZATION OF RADIO APPARATUSES

(75) Inventors: Roberto Dini, None (IT); Pietro Porzio Giusto, Rome (IT)

(73) Assignee: Sisvel Technoloy S.R.L., None (TO) (IT)

( * ) Notice: Subject to any disclaimer, the term of this patent is extended or adjusted under 35 U.S.C. 154(b) by 71 days.

(21) Appl. No.: 13/984,256

(22) PCT Filed: Mar. 26, 2012

(86) PCT No.: PCT/IT2012/000091
§ 371 (c)(1),
(2), (4) Date: Aug. 7, 2013

(87) PCT Pub. No.: WO2012/131744
PCT Pub. Date: Oct. 4, 2012

(65) Prior Publication Data
US 2013/0331125 A1  Dec. 12, 2013

(30) Foreign Application Priority Data
Mar. 29, 2011  (IT) .............................. TO2011A0284

(51) Int. Cl.
*H04W 4/02* (2009.01)
*G01S 5/02* (2010.01)
*H04W 64/00* (2009.01)
(Continued)

(52) U.S. Cl.
CPC ................ *H04W 4/023* (2013.01); *G01S 5/02* (2013.01); *G01S 5/0252* (2013.01); *G01S 5/0289* (2013.01); *H04W 64/00* (2013.01); *G01S 2205/008* (2013.01); *H04W 84/18* (2013.01); *H04W 84/20* (2013.01)

(58) Field of Classification Search
USPC .......................... 455/456.1, 456.2; 709/220
See application file for complete search history.

(56) References Cited

U.S. PATENT DOCUMENTS

| | | | |
|---|---|---|---|
| 6,477,380 B1 | 11/2002 | Uehara et al. | |
| 6,728,545 B1* | 4/2004 | Belcea | ........................ 455/456.2 |
| 2004/0082341 A1* | 4/2004 | Stanforth | ................... 455/456.1 |

(Continued)

FOREIGN PATENT DOCUMENTS

| | | |
|---|---|---|
| EP | 1 206 152 A2 | 5/2002 |
| EP | 1 978 686 A1 | 10/2008 |

(Continued)

OTHER PUBLICATIONS

International Search Report dated Jun. 14, 2012, issued in PCT Application No. PCT/IT2012/000091, filed Mar. 26, 2012.

(Continued)

*Primary Examiner* — Lester Kincaid
*Assistant Examiner* — Gary Lafontant
(74) *Attorney, Agent, or Firm* — Workman Nydegger

(57) ABSTRACT

A cooperative localization process for determining the absolute position of an apparatus to be localized includes a plurality of cooperator apparata able to cooperate, through the exchange of messages and data, in the localization of the apparatus to be localized. The cooperator apparata are equipped with at least one direct, apparatus-to-apparatus radio transmission and reception system for messages and data, and components for estimating the distance between apparata of the set of cooperator apparata. The cooperative localization apparata able to implement this process are also described.

24 Claims, 10 Drawing Sheets

(51) Int. Cl.
*H04W 84/18* (2009.01)
*H04W 84/20* (2009.01)

(56) References Cited

U.S. PATENT DOCUMENTS

| | | | |
|---|---|---|---|
| 2004/0203380 A1* | 10/2004 | Hamdi et al. | 455/41.2 |
| 2010/0105409 A1* | 4/2010 | Agarwal et al. | 455/456.1 |
| 2010/0110924 A1 | 5/2010 | Blum et al. | |
| 2010/0309804 A1 | 12/2010 | Blum et al. | |
| 2012/0179789 A1* | 7/2012 | Griot et al. | 709/220 |
| 2012/0240197 A1* | 9/2012 | Tran et al. | 726/4 |

FOREIGN PATENT DOCUMENTS

| | | |
|---|---|---|
| EP | 2 065 863 A1 | 6/2009 |
| WO | 02/03091 A2 | 1/2002 |
| WO | 02/49379 A1 | 6/2002 |

OTHER PUBLICATIONS

Italian Search Report dated Jan. 30, 2012, issued in Italian Application No. TO20110284, filed Mar. 29, 2011.

* cited by examiner

|     | 107                    | 111                    | 119                    | 123                    | 127                    |
| --- | ---------------------- | ---------------------- | ---------------------- | ---------------------- | ---------------------- |
| 107 | 0                      |                        | 29,5±1<br>15:22:34,325 |                        |                        |
| 111 |                        | 0                      | 28,3±1<br>15:22:34,325 |                        |                        |
| 119 | 29,5±1<br>15:22:34,325 | 28,3±1<br>15:22:34,325 | 0                      | 40,7±1<br>15:22:34,325 | 31,6±1<br>15:22:34,325 |
| 123 |                        |                        | 40,7±1<br>15:22:34,325 | 0                      |                        |
| 127 |                        |                        | 31,6±1<br>15:22:34,325 |                        | 0                      |

Fig. 2a

|     | 107                    | 109                    | 111                    | 119                    | 123                    | 125                    | 127                    | 128                    |
| --- | ---------------------- | ---------------------- | ---------------------- | ---------------------- | ---------------------- | ---------------------- | ---------------------- | ---------------------- |
| 107 | 0                      |                        |                        | 29,5±1<br>15:22:34,325 | 49,5±1<br>15:22:34,520 |                        |                        |                        |
| 109 |                        | 0                      |                        |                        | 46,4±1<br>15:22:34,520 |                        |                        |                        |
| 111 |                        |                        | 0                      | 28,3±1<br>15:22:34,325 |                        |                        |                        |                        |
| 119 | 29,5±1<br>15:22:34,325 |                        | 28,3±1<br>15:22:34,325 | 0                      | 40,7±1<br>15:22:34,570 |                        | 31,6±1<br>15:22:34,325 |                        |
| 123 | 49,5±1<br>15:22:34,520 | 46,4±1<br>15:22:34,520 |                        | 40,7±1<br>15:22:34,570 | 0                      | 43,8±1<br>15:22:34,520 |                        | 38,9±1<br>15:22:34,520 |
| 125 |                        |                        |                        |                        | 43,8±1<br>15:22:34,520 | 0                      |                        |                        |
| 127 |                        |                        |                        | 31,6±1<br>15:22:34,325 |                        |                        | 0                      |                        |
| 128 |                        |                        |                        |                        | 38,9±1<br>15:22:34,520 |                        |                        | 0                      |

Fig. 2b

| | 101 | 102 | 107 | 109 | 111 | 119 | 123 | 125 | 127 | 128 |
|---|---|---|---|---|---|---|---|---|---|---|
| 101 | 0 | 53,4±1 15:22:34,720 | 43,1±1 15:22:34,720 | | | | | | | |
| 102 | | 0 | 53,4±1 15:22:34,720 | | | | | | | |
| 107 | 43,1±1 15:22:34,720 | 53,4±1 15:22:34,720 | 0 | 53,5±1 15:22:34,720 | | 29,5±1 15:22:34,780 | 49,5±1 15:22:34,520 | | | |
| 109 | | | 53,5±1 15:22:34,720 | 0 | | | 46,4±1 15:22:34,520 | | | |
| 111 | | | | | 0 | 28,3±1 15:22:34,325 | | | | |
| 119 | | | 29,5±1 15:22:34,780 | | 28,3±1 15:22:34,325 | 0 | 40,7±1 15:22:34,550 | 43,8±1 15:22:34,520 | 31,6±1 15:22:34,325 | 38,9±1 15:22:34,520 |
| 123 | | | 49,5±1 15:22:34,520 | 46,4±1 15:22:34,520 | | 40,7±1 15:22:34,550 | 0 | 43,8±1 15:22:34,520 | | |
| 125 | | | | | | | 43,8±1 15:22:34,520 | 0 | | |
| 127 | | | | | | 31,6±1 15:22:34,325 | | | 0 | |
| 128 | | | | | | 38,9±1 15:22:34,520 | | | | 0 |

Fig. 2c

| | 101 | 102 | 103 | 107 | 109 | 111 | 117 | 119 | 120 | 123 | 125 | 127 | 128 |
|---|---|---|---|---|---|---|---|---|---|---|---|---|---|
| 101 | 0 | | | 43,1±1<br>15:22:34,720 | | | | | | | | | |
| 102 | | 0 | | 53,4±1<br>15:22:34,720 | | | | | | | | | |
| 103 | | | 0 | | 47,3±1<br>15:22:34,920 | | | | | | | | |
| 107 | 43,1±1<br>15:22:34,720 | 53,4±1<br>15:22:34,720 | | 0 | 53,5±1<br>15:22:34,920 | | | 29,5±1<br>15:22:34,780 | | 49,5±1<br>15:22:34,520 | | | |
| 109 | | | 47,3±1<br>15:22:34,920 | 53,5±1<br>15:22:34,920 | 0 | | 520±3<br>15:22:34,920 | | 46,8±1<br>15:22:34,920 | 46,4±1<br>15:22:34,950 | 57,5±1<br>15:22:34,920 | | |
| 111 | | | | | | 0 | | 28,3±1<br>15:22:34,325 | | | | | |
| 117 | | | | | 520±3<br>15:22:34,920 | | 0 | | | | | | |
| 119 | | | | 29,5±1<br>15:22:34,780 | | 28,3±1<br>15:22:34,325 | | 0 | | 40,7±1<br>15:22:34,980 | | 31,6±1<br>15:22:34,325 | |
| 120 | | | | | 46,8±1<br>15:22:34,920 | | | | 0 | | | | |
| 123 | | | | 49,5±1<br>15:22:34,520 | 46,4±1<br>15:22:34,950 | | | 40,7±1<br>15:22:34,980 | | 0 | 43,8±1<br>15:22:34,520 | | 38,9±1<br>15:22:34,520 |
| 125 | | | | | 57,5±1<br>15:22:34,920 | | | | | 43,8±1<br>15:22:34,520 | 0 | | |
| 127 | | | | | | | | 31,6±1<br>15:22:34,325 | | | | 0 | |
| 128 | | | | | | | | | | 38,9±1<br>15:22:34,520 | | | 0 |

| Apparatus | To be positioned | Node | No. radio hops | Mobile | Latitude (dec. degrees) | Accuracy (dec. degrees) | Longitude (dec. degrees) | Accuracy (m) | Altitude (m) | Accuracy (m) | Speed (m/s) | Accuracy (m/s) | Timestamp | Other Data |
|---|---|---|---|---|---|---|---|---|---|---|---|---|---|---|
| 107 | N | N | 1 | Y | | | | | | | | | 15:22:34,325 | ... |
| 111 | N | N | 1 | Y | | | | | | | | | 15:22:34,325 | ... |
| 119 | Y | N | 0 | Y | | | | | | | | | 15:22:34,325 | ... |
| 123 | N | N | 1 | Y | | | | | | | | | 15:22:34,325 | ... |
| 127 | N | N | 1 | Y | | | | | | | | | 15:22:34,325 | ... |

Fig. 3b

| Apparatus | To be positioned | Node | No. radio hops | Mobile | Latitude (dec. degrees) | Accuracy (dec. degrees) | Longitude (dec. degrees) | Accuracy (m) | Altitude (m) | Accuracy (m) | Speed (m/s) | Accuracy (m/s) | Timestamp | Other Data |
|---|---|---|---|---|---|---|---|---|---|---|---|---|---|---|
| 107 | N | Y | 1 | Y | | | | | | | | | 15:22:34,325 | ... |
| 109 | N | N | 2 | Y | | | | | | | | | 15:22:34,325 | ... |
| 111 | N | N | 1 | Y | | | | | | | | | 15:22:34,325 | ... |
| 119 | Y | Y | 0 | Y | | | | | | | | | 15:22:34,520 | ... |
| 123 | N | Y | 1 | Y | | | | | | | | | 15:22:34,325 | ... |
| 125 | N | N | 2 | Y | 41,8901 | ±5 | 12,4924 | ±5 | 120 | ±5 | 1 | ±0,1 | 15:22:34,450 | ... |
| 127 | N | N | 1 | Y | | | | | | | | | 15:22:34,325 | ... |
| 128 | N | N | 2 | Y | | | | | | | | | 15:22:34,520 | ... |

Fig. 3c

| Apparatus | To be positioned | Node | No. radio hops | Mobile | Latitude (dec. degrees) | Accuracy (dec. degrees) | Longitude (dec. degrees) | Accuracy (dec. degrees) | Altitude (m) | Accuracy (m) | Speed (m/s) | Accuracy (m/s) | Timestamp | Other Data |
|---|---|---|---|---|---|---|---|---|---|---|---|---|---|---|
| 101 | N | N | 2 | Y | | | | | | | | | 15:22:34,720 | ... |
| 102 | N | N | 2 | Y | 41,89019 | ±5 | 12,49236 | ±5 | 120 | ±5 | | | ±0,1 | 15:22:34,650 | ... |
| 107 | N | N | 1 | Y | | | | | | | | | 15:22:34,720 | ... |
| 109 | N | Y | 2 | Y | | | | | | | | | 15:22:34,520 | ... |
| 111 | N | N | 1 | Y | | | | | | | | | 15:22:34,325 | ... |
| 119 | Y | Y | 0 | Y | | | | | | | | | 15:22:34,720 | ... |
| 123 | N | Y | 1 | Y | | | | | | | | | 15:22:34,325 | ... |
| 125 | N | N | 2 | Y | 41,8901 | ±5 | 12,4924 | ±5 | 120 | ±5 | | | ±0,1 | 15:22:34,450 | ... |
| 127 | N | N | 1 | Y | | | | | | | | | | ... |
| 128 | N | N | 2 | Y | | | | | | | | | 15:22:34,325 | ... |

Fig. 3d

| Apparatus | To be positioned | Node | No. radio hops | Mobile | Latitude (dec. degrees) | Accuracy (dec. degrees) | Longitude (dec. degrees) | Accuracy (dec. degrees) | Altitude (m) | Accuracy (m) | Speed (m/s) | Accuracy (m/s) | Timestamp | Other Data |
|---|---|---|---|---|---|---|---|---|---|---|---|---|---|---|
| 101 | N | N | 2 | Y | | | | | | | | | 15:22:34,720 | ... |
| 102 | N | N | 2 | Y | 41,89019 | ±5 | 12,49236 | ±5 | 120 | ±5 | | | ±0,1 | 15:22:34,650 | ... |
| 103 | N | N | 3 | Y | | | | | | | | | 15:22:34,920 | ... |
| 107 | N | Y | 1 | Y | | | | | | | | | 15:22:34,720 | ... |
| 109 | N | Y | 2 | Y | | | | | | | | | 15:22:34,520 | ... |
| 111 | N | N | 1 | N | | | | | | | | | 15:22:34,325 | ... |
| 117 | N | N | 3 | Y | 41,8901 | 1 | 12,4924 | 1 | 120 | 1 | 1 | | | 15:22:34,870 | ... |
| 119 | Y | Y | 0 | Y | | | | | | | | | 15:22:34,720 | ... |
| 120 | N | N | 3 | N | | | | | | | | | 15:22:34,920 | ... |
| 123 | N | Y | 1 | Y | | | | | | | | | 15:22:34,890 | ... |
| 125 | N | N | 2 | Y | 41,8901 | ±5 | 12,4924 | ±5 | 120 | ±5 | | | ±0,1 | 15:22:34,450 | ... |
| 127 | N | N | 1 | Y | | | | | | | | | 15:22:34,325 | ... |
| 128 | N | N | 2 | Y | | | | | | | | | 15:22:34,325 | ... |

COOPERATIVE LOCALIZATION OF RADIO APPARATUSES

BACKGROUND OF THE INVENTION

1. Field of the Invention

The present invention relates to a cooperative localization process and related apparata. In particular, the present invention relates to a process and related apparata that enable estimating the position of radio apparata that do not have access to localization systems, or where these are not working or are ineffective, and in which the acquisition of data for calculating the unknown positions takes place through the cooperation of apparata that are present in the surrounding area.

2. Present State of the Art

In recent years, determining the position of apparata has grown in importance, due both to interest in services known as LBS (Localization Based Services) and to accompany emergency calls with caller position data. Various process and systems have been studied and implemented for determining the position of radio apparata, some of which are based on satellite systems, such as GPS (Global Positioning System), GLONASS (GLObal NAvigation Satellite System), GALILEO (currently being implemented by the EU) and COMPASS (currently being implemented by China), while other are based on terrestrial radio systems, and cellular systems in particular.

The most well-known terrestrial process for determining the position of a terminal are:
- identification of the radio cell from which the terminal signal originates;
- determination of the area of coverage common to the radio stations that simultaneously receive the terminal's signal;
- identification of the radio cell from which the terminal's signal originates combined with an estimate of the distance of the terminal from the radio base station;
- triangulation, or rather determination of the directions of origin of the terminal's signal in at least two other radio stations, with calculation of the intersection of the corresponding lines;
- multilateration, or rather estimation of the distance of the terminal from at least three radio base stations, the geographic coordinates of which are known, with calculation of the point that satisfies said distances;
- determination of at least two different cases with differences in distance between the terminal and the two base stations of a pair of stations, with calculation of the point that satisfies said distance differences.

Some of the above-listed terrestrial process use the estimate of distances of the terminal from the radio stations, which can be obtained using various techniques:
- the ratio between of the received signal and the power of the transmitted signal, whether in the base-mobile direction (in the case of WCDMA, this ratio corresponds to RSCP parameter—Received Signal Code Power), or in the opposite direction;
- measurement of the propagation time between transmitter and receiver;
- measurement of the round-trip time of the electromagnetic waves from the base station to the terminal (in some systems, including GSM, this can be deduced from the TA (Timing Advance), i.e. the time by which the terminal must anticipate transmission of its signals to make them arrive at the base stations in the established time windows),
- any other technique that enables obtaining the same result.

In other cases, the terrestrial process use three or more distance differences between the terminal and two radio stations and the intersections of the hyperbolae that these differences define. As a rule, these differences are calculated by observing the difference in time that the radio signals employ for travelling along the two different propagation paths (Observed Time Difference, OTD), with variants of the techniques dependent on the process used for synchronising the stations or to take into account the time lag between their clocks.

However, the known solutions indicated above have certain technical problems and drawbacks. In particular, satellite localization systems require a number of satellites to be electromagnetically visible from the apparatus to be localized and entail long, initial acquisition times. With the A-GPS (Assisted-GPS) system, the cell stations provide the terminals with preliminary data on the satellite system with which the terminals can increase GPS signal reception sensitivity and shorten the initial acquisition, but times remain very long when GPS is unavailable because the propagation of the signals transmitted by the satellites is blocked by natural or artificial obstacles.

Similarly, excluding techniques that refer to just one radio station, in many places localization systems based on cellular networks cannot be used because there is not always electromagnetic visibility between the apparatus to be localized and at least two radio stations (required by the above-mentioned, rather imprecise triangulation technique) or three radio stations, needed for hyperbolic or multilateration systems. There again, techniques that refer to just one radio station normally offer inadequate accuracy, and so it must be concluded that in many places both satellite localization systems and terrestrial ones are not available or do not provide an estimate of terminal position with sufficient accuracy.

To compensate these shortcomings, process have been proposed that, for estimating the position of an apparatus that cannot access localization systems, use the position data of other apparata that are in the vicinity. The process described in patent EP1206152 belongs to this category. According to this process, the terminal to be localized has a radio transceiver system that enables it to establish two-way connections with other terminals that are in the vicinity. By means of said radio transceiver system, the terminal to be localized has the nearby terminals send it data regarding their respective positions and estimates the distance of each one of them with an evaluation of propagation attenuation. The terminal to be localized estimates its position on the basis of this data.

In a first embodiment of the process, the unknown position is calculated as the mean of the positions of the terminals that have provided their position. In this case, there is no guarantee on the accuracy of the calculated position, as there is no information on the relative position of the terminal to be localized with respect to those that are in the vicinity, particularly if it is assumed that the terminal to be localized, like the surrounding ones from which it waits for data, has a localization system that it momentarily cannot access. In this case, terminals very close to the one to be localized are probably also unable to determine their own position by means of an external localization system. It is therefore likely that the positions from which the mean is calculated correspond to points further away from the terminal to be localized, and not arranged uniformly around it, but more likely arranged in an irregular and unbalanced manner. Furthermore, the estimate of the distances made on the basis of propagation attenuation can be misleading, especially if conditions are considered where signals are propagated inside buildings or in areas with natural or artificial obstacles. For example, a terminal close by, but separated by a wall or a ceiling can appear further away than a terminal whose signals arrive through a window from a distant external point. By applying the process of patent EP1206152, it is therefore probable that a terminal inside a building calculates that it is on the outside instead.

In a second embodiment of the process of patent EP1206152, the unknown position is calculated with multi-lateration of the distances and positions of the terminals that have communicated their position data. In this case, it is necessary to have at least three terminals, which know their own position and are electromagnetically visible to the terminal to be localized; the probability of this occurring might not be very high. Then, should three terminals be found in these conditions, as mentioned above, it is likely that they are not close to the terminal to be localized and that the determination of the distance from them by measurement of the power of the signals received from them is misleading. Therefore, the process of patent EP1206152 does not appear to be reliable.

SUMMARY OF THE INVENTION

The object of the present invention is that of resolving the above-stated problems of the prior art by providing a cooperative localization process and related apparata that enable calculation of the position of one or more apparata that request their positioning without having access to localization process.

The above-stated objects and other objects and advantages of the invention, as shall emerge from the following description, are achieved with a cooperative localization process that forms the subject matter of claim 1.

Furthermore, the above-stated objects and other objects and advantages of the invention are achieved with radio communication apparata that form the subject matter of claims 17 to 20.

Preferred embodiments and non-trivial variants form the subject matter of the dependent claims.

It is understood that all the appended claims form an integral part of the present description.

BRIEF DESCRIPTION OF THE DRAWINGS

The present invention will now be described in greater detail by some preferred embodiments, provided by non-limitative way of example and with reference to the attached drawings, where:

FIG. 2a shows a chart representing a table of the distances regarding the example in FIG. 1a;

FIG. 2b shows a chart representing a table of the distances regarding the example in FIG. 1b;

FIG. 2c shows a chart representing a table of the distances regarding the example in FIG. 1c;

FIG. 2d shows a chart representing a table of the distances regarding the example in FIG. 1d;

FIG. 3a shows a data table regarding the example in FIG. 1a;

FIG. 3b shows a data table regarding the example in FIG. 1b,

FIG. 3c shows a data table regarding the example in FIG. 1c;

FIG. 3d shows a data table regarding the example in FIG. 1d;

DETAILED DESCRIPTION OF THE PREFERRED EMBODIMENTS

Figure 1A:
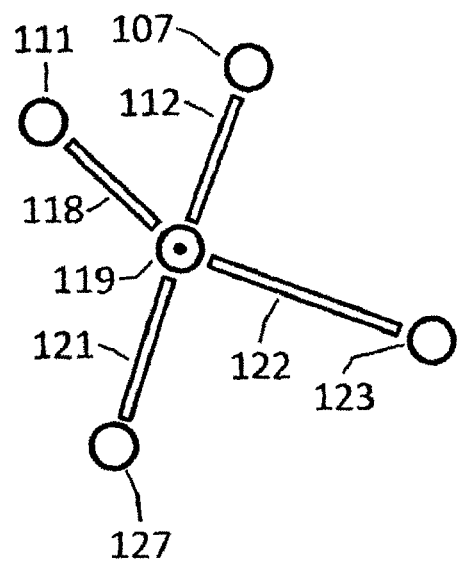
FIG. 1a shows a diagram representing an example of a first development stage of a localization network.

The following terms and related definitions will be used further on in the description:

relay apparatus: an apparatus that acts as a relay for connections between other apparata;

controller (controller apparatus): the cooperator apparatus (see below) that currently has the role of managing the localization procedure;

cooperator (cooperator apparatus): an apparatus that cooperates in the localization process;

explorer (explorer apparatus): an apparatus instructed by the controller to emit a search signal and to return the data collected from the replies to said signal to the controller;

active cooperator: a cooperator apparatus capable of carrying out the controller function, the explorer function and also the relay apparatus function;

passive cooperator: a cooperator apparatus not equipped with the specific means of the present invention's process and therefore unable to act as a controller apparatus, an explorer apparatus or a relay apparatus, but equipped with telecommunications systems that permit active cooperator apparata, equipped with the same telecommunications systems as the passive cooperator apparatus, to estimate the distance and/or receive and/or derive absolute position data from the passive cooperator apparatus;

inert cooperator: a cooperator apparatus equipped with means that enable active cooperators to detect its presence, to estimate the distance from it and to indirectly obtain data regarding its position, cross-referencing data originating from the inert cooperator with data originating from at least one other source of information;

localization grid: a set of cooperator apparata and the radio links through which they interconnect, which form a grid of adjacent triangles of known sides;

node: an apparatus that is located at an apex of one of the triangles of the localization grid;

localization network: the set of cooperator apparata and their possible connections;

distance table: a data matrix containing the distances that separate the cooperator apparata, with the related uncertainties and the times to which the measurements refer;

data table: a table that contains sundry data regarding the individual cooperator apparata, as described in the following.

The active cooperator apparata are preferably equipped with the following specific means:
- a suitable radio transceiver system for transmitting and receiving the messages and data necessary for implementing the process according to the present invention;
- means for estimating the distances between apparata with reciprocal electromagnetic visibility according to the requirements of the present invention;
- digital memories for storing at least the distance table and the data table;
- processing means for executing computer programs, processing received data and carrying out the necessary numerical calculations for implementing the process according to the present invention.

In addition, they are preferably equipped with:
- calculation means able to implement optimization algorithms for carrying out coordinate calculations having data that is redundant or missing and affected by uncertainties.

The following symbols are used in the text that follows and in the attached figures:
- $H_M$: maximum number of radio links from an cooperator apparatus to the controller apparatus beyond which a cooperator apparatus cannot assume the role of explorer;
- $N_M$: maximum number of apparata that can be involved in the positioning procedure, beyond which the localization network development procedure terminates;
- $T_a$: duration of receiver switch-on in the sleep mode cycle;
- $T_c$: duration of the receiver's sleep mode cycle;
- $T_E$: minimum time interval that must elapse between two assignments of the role of explorer for the same apparatus;
- $T_L$: time limit beyond which confirmation of interest in calculating the position is requested;
- $T_p$: duration of the alert code, sent in the preamble of the search signal to alert the receivers;
- $T_s$: duration of receiver switch-off in the sleep mode cycle;
- $T_W$: time interval, starting from the most recent time when an apparatus has been engaged in transmission or reception, after which the receiver of the apparatus passes to sleep mode.

In general, as shall be seen further on in greater detail, the process according to the present invention is based on the creation of a localization grid composed of adjacent triangles, the apexes of which are known as the nodes of the grid and are where the apparata that cooperate in the positioning are situated. In addition to the apparata that are at the nodes of the grid, there are also apparata that can directly or indirectly establish connections with these nodes and cooperate in the positioning process, but do not belong to the grid because they do not have a sufficient number of constraints to constitute the apex of a triangle. The set of all the apparata that cooperate in the calculation of the requested positions (cooperator apparata) and the connections that they can establish constitute the localization network. With regard to the radio links through which the cooperator apparata can establish connections, the distance between the corresponding apparata is estimated. This distance estimate can be obtained through any technique, such as any of those previously mentioned for example. The choice of this technique has no importance for the purposes of the present invention and will therefore be ignored throughout the treatment that follows. The localization network is gradually expanded in successive steps so as to obtain sufficient data, through the apparata that are gradually added, to position the localization grid and, in consequence, its nodes, finishing with also calculating the position of the node-apparatus to be localized.

One of the apparata of the localization network assumes the controller function of the localization process. Preferably, the controller function is assigned to one of the apparata for which the position needs to be determined, but it can also be assigned to apparata that do request positioning. The controller function can be moved from one apparatus to another during the localization network creation and development phase.

The creation and development of the localization network takes place through the successive transmission of appropriate "search signals" by the cooperator apparata upon receiving special search commands issued by the controller apparatus and possibly forwarded through intermediate apparata, which function as relay apparata. The apparata that respond to the search signals (called responding apparata) are added to the set of cooperator apparata and the controller is informed of their existence and the direct connections that they have with the other cooperator apparata by the response messages that the explorer apparata receive from the responding apparata and which they forward to the controller, if necessary through the above-stated relay apparata.

The topology of the connections between the cooperator apparata is preferably of the tree type, but can also be of another type (for example, a grid). In the exemplifying case of a tree structure, the root of the connections tree preferably coincides with the controller apparatus that manages both the connections and the creation of the localization network and that, once development of the localization network is completed, calculates the position of each of the apparata that requests it and communicates it to them.

Development of the localization network ends in one of the following cases:
- when a sufficient amount of position and distance data is found that enables the position and spatial orientation of the localization grid to be geometrically determined, or
- when a predetermined numeric limit $N_M$ of cooperator apparata is reached or exceeded, in order to avoid involving an excessive number of apparata, or
- when a predetermined time limit $T_L$, running from when the process was started, is exceeded.

A limit $H_M$ is also defined on the number of radio links necessary for connecting a cooperator apparatus to the controller apparatus. If a number of radio links greater or equal to said limit $H_M$ is needed to connect a given apparatus, said given apparatus is barred from emitting search signals. This bar normally limits the number of radio links necessary for connecting a cooperator apparatus to the controller apparatus to $H_M$, as other cooperators cannot be added in cascade to said given cooperator apparatus. This limit can be exceeded, for example, if the connection of a cooperator apparatus to the controller is set up through relay apparata and, due to a change in propagation conditions, one of said relay apparata becomes excluded from the localization network and transit through it is replaced by cascaded relaying through another two or more apparata.

If development of the localization network ends without having acquired an adequate number of data points to geometrically determine the position of the apparata that have requested it, correlations are applied with radio limits and with the map of the area where the localization network is located in order to reduce the uncertainties.

The radio transceiver system with which the connections between the apparata are created can be made ad hoc or be one of those known, as long as it enables estimating apparatus-to-apparatus distances with sufficient accuracy. In addition, it can also be non-homogeneous, or rather the localization network can contain connections implemented by mutually different systems and standards of transmission and reception (GSM/GPRS, UMTS, LTE, Bluetooth, Wi-Fi, RFID, etc.). In fact, it is sufficient to be able to establish connections between pairs of apparata and therefore it is sufficient that the apparata have, two by two, the same transmission and reception system, on condition that there are apparata equipped with means to act as an interface between apparata that use different transmission systems. For example, if a first set of apparata uses the Wi-Fi P2P transmission and reception system and a second set of apparata used the ZigBee system, any apparatus belonging to this first set can interconnect to any apparatus belonging to this second set if at least one apparatus exists that has both Wi-Fi P2P and ZigBee.

In particular, the process according to the present invention comprises at least one phase of creating and developing a localization network, the description of which is provided by means of a simple illustrative example, in which the need to calculate the position of just one apparatus that does not have access to a localization systems is assumed. The description will be subsequently extended to cover situations that are more complex. FIG. 1a shows a first stage of the illustrative example of the localization network creation and development phase, aimed at determining the geographic coordinates of the apparatus represented by circle 119.

In the illustrative example, it is assumed that apparatus 119 receives a request, from the user or an entity connected by a telecommunications system, to determine its position when it cannot access any localization system or when this system is unable to localize the apparatus, for whatever reason. In these conditions, apparatus 119 assumes the role of controller and, following a search command received by its radio transmission and reception system specific to the process according to the present invention, it emits a first search signal, containing a message with the following meaning: "I am 119. Apparata that receive this message should reply with a report indicating the respondent's identification code and, if known, data that enables identifying their respective absolute position". Generally speaking, if a preferred radio system is used for implementing the present invention, such as Wi-Fi Direct for example, the simple arrival of a response from a responding apparatus enables the explorer to estimate the distance separating them. In the case where other radio systems are used, the search signal could include a request to send the necessary data for estimating said distance (for example, transmission power and/or information on the time of emission of the response).

It is also advantageous for the search signal to contain a request for other auxiliary data, which will be described in greater detail further on, if known to the respondent and knowledge of which is useful for the task performed by the controller 119. If permitted by the radio system, the search signal should preferably contain a request for all data potentially useful to locating the apparatus to be localized, which should preferably be contained in a single response message. This permits the time employed and the number of messages needed for acquiring localization information to be minimized. However, due to the particular radio system used and/or the characteristics of the communicating apparata, multiple exchanges of round-trip messages might be necessary to enable the explorer to acquire all the data considered necessary from the respondent, which it must then send to the controller apparatus in a generic exploration step of the process.

Returning now to this first step of expanding the localization network of the illustrative example, apparatus 119 assumes the role of the only explorer and also of the only cooperator apparatus. For greater clarity, the apparata in FIGS. 1a, 1b, 1c and 1d that have emitted the last search signal are marked with a center dot.

In this illustrative example, the first message emitted by explorer apparatus 119 is answered by apparata 107, 111, 127 and 123, which thus assume the role of cooperators. With the responses from these apparata, in this case received directly without the aid of intermediate apparata, and by means of any distance estimation technique, apparatus 119 also acquires the distances 112, 118, 121 and 122 that respectively separate it from apparata 107, 111, 127 and 123. The distances are then placed in the distance table, which with regard to the situation under examination is shown in FIG. 2a, where each box indicates the distance in meters between the apparata indicated at the beginning of the corresponding row and the corresponding column: with each distance item, there is an related measurement uncertainty and the time when the measurement was taken. The distance table is clearly symmetrical and the items on its main diagonal are all null, and so in a practical embodiment, said table can be implemented in a more compact form than that shown in the attached figures. In any case, it constitutes one of numerous equivalents known to an expert in the field for representing the network of connections that are formed between the cooperator apparata and the related characteristic parameters of the radio links and the nodes that form it. It should be noted that, in general, the distance table can also contain multiple distance and time of calculation values in the case of multiple point-to-point connections due to the presence of message exchanges over multiple radio systems on which the two terminal apparata involved can communicate. It is the controller apparatus that, if necessary, decides which connections to keep and update on the basis of, for example, the type, reliability and precision of the data obtainable on the distance corresponding to a certain radio link. For simplicity, in the illustrative example it is assumed that all of the network connections are single ones.

The times specified in the distance table, like those specified in the data table described further on, take into account the transmission delays and misalignments between the clocks of the apparata. The process of taking these factors into account is dealt with further on. The numerical values provided in the attached figures are purely for illustrative purposes and do not refer to any real situation.

In addition to the identification code of each respondent, the controller apparatus 119 also acquires certain data regarding the individual responding apparata, which is transmitted by them and collected in the data table. FIG. 3a shows a simplified version of this data table in relation to the state of the system represented in FIG. 1a. In the table in FIG. 3a, the first column lists an identification code of the apparatus. In the example, the same codes used for identifying the items in the other attached figures are used as the identification codes. In practical applications, the MAC (Medium Access Control) addresses of the apparata, or codes agreed between the controller and cooperator, or other identifying codes that can be set in bijective correspondence to the apparata can be used as identification codes.

The second column of data table indicates whether or not the apparatus has made a positioning request. In this column, as in the other entries in the attached tables, symbol "Y" is affirmative, while symbol "N" is negative.

In general, as shall be seen in the following, the apparata must in any case be identified and positioning can be requested for one or more of them.

Amongst the criteria used in developing the localization network, there is one that tends to make the apparata for which positioning is requested appear at the nodes of the localization grid.

The third column indicates whether or not the apparatus is a node of the grid. This information is used as one of the selection criteria for the apparatus to be ordered to emit a search signal, similar to the first search signal, as will be seen further below.

The fourth column contained the number of radio links that separate the apparatus under consideration from the controller apparatus. As has been mentioned, apparata with a number of radio links greater or equal to $H_M$ (maximum number of radio links from the controller apparatus) are barred from emitting search signals. In this column, the "zero" value identifies the controller apparatus, while the absence of values could only arise in fault situations.

The fifth column indicated whether or not the apparatus is mobile. This information is used to establish possible needs to update data.

The next eight columns hold the localization and speed data, each followed by a respective uncertainty. These are followed by the time column, which indicates the time when the data in the row was updated. As there are a number of data items on each row, the data update time of a row is assumed to be that of the oldest updated data item.

After the time column, there are other columns with "auxiliary data" of various types and different uses. For example, it is possible to find:
  list of the users and entities requesting localization;
  addresses where the results should be sent;
  time when the apparatus most recently assumed the role of explorer;
  type of apparatus (mobile phone terminal, Wi-Fi access point, cordless phone, domestic appliance, etc.);
  availability of satellite localization systems;
  availability of terrestrial localization systems;
  availability of distance measurement process.

This information can determine preference criteria in selecting the apparata to be ordered to emit said search signals.

At each stage of the positioning procedure, by means of a special data-processing program, the controller apparatus analyzes the collected data and establishes the next step to take. In the example being illustrated, controller apparatus 119 analyzes the data in the data table in FIG. 3a and finds that the fixed-point constraints are insufficient to position apparatus 119. The controller therefore decides to expand exploration of the surrounding area to identify other apparata and retrieve further data. The expansion of exploration takes place by ordering other apparata to emit a second search signal, similar to the first search signal emitted by apparatus 119, and by reporting back to controller apparatus 119 with the data collected in response, possibly by means of relay apparata inserted between the apparata responding to the search signal and the controller apparatus.

This expansion step can take place in many alternative ways, for example, that of requesting the emission of the second search signal to all the respondents to the first search signal, or to a subset of the respondents, or to just one of these respondents in particular. Each selected explorer will therefore be reached by a special search command addressed to it, emitted by the controller apparatus and possibly forwarded by intermediate relay cooperator apparata. In the illustrative example that is being considered, it is assumed that it is expedient to limit as much as possible the number of apparata involved in the procedure, as well as the number of messages that are transmitted via radio. By applying this criterion, the controller commands just one of said respondents in the previous step to emit a second search signal.

Various criteria can be applied to selecting the apparatus to be ordered to emit the second search signal, according to the current situation. Some of these criteria are applied during this illustration, but purely by way of non-limitative example, it being understood that many other criteria can be applied either individually or in combination. First of all, the controller checks which apparata have a number of radio links that separate them from controller apparatus 119 that does not exceed limit $H_M$, which, by way of example, is assumed to be five. The value of $H_M$ can be predetermined or be set upon starting the process. Given the values indicated in the table in FIG. 3a, no apparatus is found to be excluded by limit $H_M$.

In the state characterized by the data in the distance table indicated in FIG. 2a and in the data table indicated in FIG. 3a, it can be observed, for example, that what differentiates the respondents on the first search signal is just the distance they have from apparatus 119.

Assuming that apparatus 119 is equipped with a satellite localization system (information available from the auxiliary data in the data table) and considering that, in spite of this, it does not know its localization, it is assumed that apparatus 119 is located outside the satellite system's coverage. In consequence, it could be assumed that the apparatus most likely to have access to a satellite localization system is the one furthest away from apparatus 119, which in the example under consideration is apparatus 123. The controller consequently selects apparatus 123 for the emission of a second search signal and emits a special search command addressed to that apparatus. Instead, if apparatus 119 was not equipped with any localization system, it might be more sensible to have the second search signal emitted by the apparatus closest to it, assuming that it is possible to better estimate the distances of nearby apparata than far-away apparata. In this second case, the search command would be addressed to the cooperator apparatus closest to the one whose position needs to be determined (in this case, the controller apparatus itself).

It should be underlined that there can be numerous and different selection criteria, but, as will be understood from following this illustration of the process, the use of different criteria and the adoption of different decisions is not, in general, prejudicial to achieving the result, but can only bring about a different number of steps and a different number of apparata involved in the process.

Figure 1B:
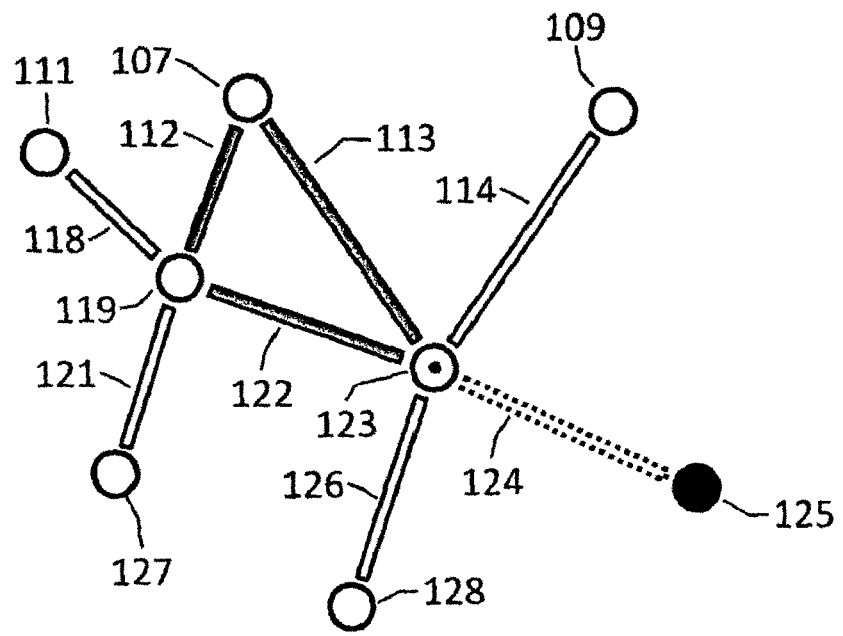
FIG. 1b shows a diagram representing an example of a second development stage of a localization network.

Therefore, continuing with the illustration and the assumption that it is apparatus 123 that emits a second search signal, FIG. 1b represents a hypothetical situation that follows the emission of the second search signal. This situation corresponds to case where there is a response to the second search signal from apparatus 107, which had already responded to the first search signal, apparata 109 and 128, which have similar characteristics to apparatus 107, and apparatus 125, represented by a black circle to indicate that it also has data on its own position, which is included in the response message. Obviously, the controller 119 does not respond, as it recognizes from the headers of the search signal that it was the one that emitted the search command. Also in this case, the identification codes of the respondents and the distances 113, 114, 124 and 126 of the respondents from the apparatus that emitted the second search signal are acquired from the responses to the second search signal.

Apparatus 123 transfers all of the above-stated information directly to apparatus 119, the procedure controller, and apparatus 119 updates the distance table, as shown in FIG. 2b, and the data table, as shown in FIG. 3b.

From analysis of the distance table in FIG. 2b it emerges that apparata 107, 119 and 123 are at the apexes of a triangle of known sides (an estimate exists of the distances between all the pairs of said three apparata). A first embryo of a localization grid has therefore been established. For greater clarity, the radio links forming triangle sides are shown shaded; the radio links that traverse known distances from apparatus-nodes of which the absolute position is known are shown with dotted lines. This result is reflected in the "Node" column of the table in FIG. 3b, in which apparata 107, 119 and 123 are catalogued as nodes. From analysis of this data table, it is found that apparatus 125 knows its own position in space.

To determine the position of apparatus 119 it is now sufficient to just calculate the position of this triangle, which however is constrained by just one fixed point (apparatus 125) at a single distance (124), and consequently cannot be geometrically positioned. Processing therefore continues with a further expansion of the localization network.

As in the case of emission of the second search signal, a third search signal is then emitted by just one apparatus. Also in this case, it is found that none of the apparata listed in the data table in FIG. 3b exceed the limit $H_M$=5 for the number of radio links, and the controller apparatus 119 proceeds with selecting the apparatus, from those listed in the first column in FIG. 3b, to perform the emission.

Discussion of the various alternatives and the various selection criteria for the apparatus to be given the task of emitting the third search signal shall not be dwelt upon for motives of brevity, but it should be noted that apparatus 107 is the only one of those at the apexes of said triangle that has not yet emitted any search signal. The controller apparatus 119 therefore decides that apparatus 107 should emit a third search signal, by emitting a specific search command addressed to it.

Figure 1C:
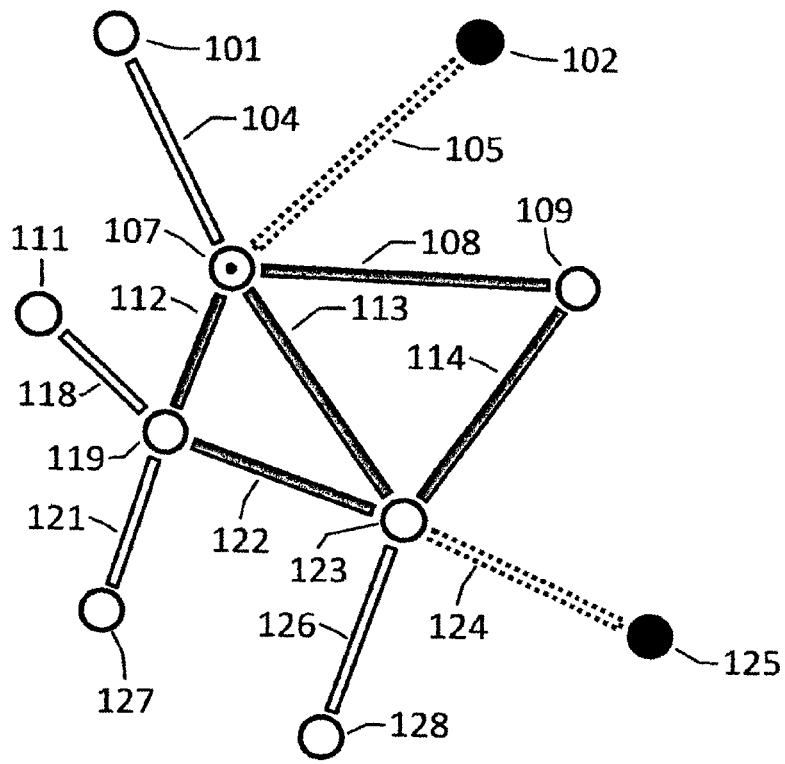
FIG. 1c shows a diagram representing an example of a third development stage of a localization network.

It is then assumed that apparata 101, 102 and 109 respond to this third search signal, shown in FIG. 1c, and that the data obtained from the responses of these responding apparata is that indicated in FIGS. 2c and 3c, as forwarded to the controller apparatus 119 by explorer 107.

From analysis of the distance table indicated in FIG. 2, it emerges that a second triangle has been formed with apparata 123, 107 and 109 at its apexes. In line with this, apparatus 109 is now classified as a node in the "Node" column of the table in FIG. 3c. This new triangle has side 113 coincident with that of triangle 119-123-107, and so a grid of two triangles has been formed that has apparata 119, 123, 109 and 107 as its nodes.

From analysis of the data table in FIG. 3c, it is found that apparatus 102 knows its own position in space, and so it ensues that this grid of two triangles has two constraints regarding apparata 102 and 125, formed by the distances 105 and 124 (FIG. 1c). These two constraints are not sufficient to geometrically position the grid (a grid of triangles on a plane has three degrees of freedom). It is therefore necessary to further expand the localization network.

Similarly to the previous expansions, after checking for exceeding limit $H_M$, the controller apparatus causes a fourth search signal to be emitted, by means of an related search command, selecting apparatus 109 as the addressed explorer, because apparatus 109 is the only one of the nodes on the grid that has not yet emitted any search signals. Transmission of the search command from the controller apparatus 119 to apparatus 109 and the possible responses from the respondents to the explorer in the opposite direction takes place with transit through relay apparatus 123 instead of the alternative of transit through apparatus 107, because when transiting through apparatus 123 certain data regarding apparatus 123, data regarding segment 112, which is less recent than the data regarding apparatus 107 (with regard to this, see the data table indicated in FIG. 3c) and data regarding segment 122 (as specified in the distance table indicated in FIG. 2c) is updated. Therefore, the controller emits a search command addressed to apparatus 109, routing it through relay apparatus 123.

Figure 1D:
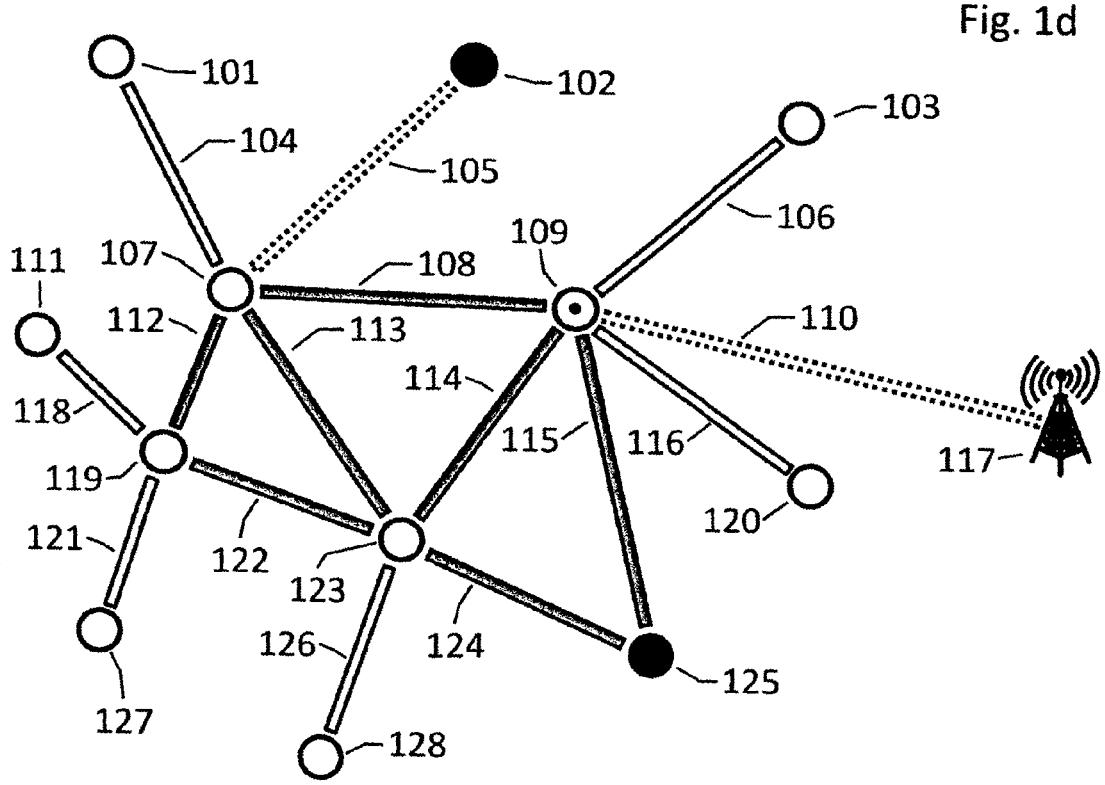
FIG. 1d shows a diagram representing an example of a fourth development stage of a localization network.

It is assumed that apparata 103, 117, 120, 125, 123 and 107 respond to this fourth search signal, shown in FIG. 1d, and that the data obtained from the responses of these apparata is that indicated in FIGS. 2d and 3d. This data is forwarded by explorer 109 to the controller 119 through the same relay apparatus 123 via which the search command had arrived to explorer 109.

From analysis of the distance table indicated in FIG. 2d, it emerges that a grid of three triangles has been created, with apparata 119, 123, 125, 109 and 107 at its five nodes. This grid of five nodes has four constraints, provided by distances 105 and 110 and by located node 125, which are not only sufficient, but even redundant for the purpose of positioning this grid of three triangles. It is therefore possible to geometrically calculate the coordinates of all the nodes of this grid, and in particular the coordinates of node 119. The controller can therefore terminate the localization network development phase and pass to calculating the positions.

While in the illustrative example used up till now, the localization network creation phase ends at a point where a sufficient amount of data has been acquired to calculate the position of the apparata to be localized, development of the localization network can also stop after the following two events:
a) exceeding the limit $N_M$ for the number of cooperator apparata;
b) exceeding the time limit $T_L$, running from when the procedure was started.

Stopping in the case of event a) is motivated by the need to avoid involving an excessive number of apparata, which could happen in particularly crowded environments and cause unacceptable levels of interference and radio packet collisions.

During the localization network development phase, it can happen however that conditions are identified whereby some cooperators are found to be superfluous (for example, cooperators very close to the controller without localization data while far-away positioned cooperators have been identified). In these cases, the controller can strike off the superfluous cooperators, or not count them when checking if limit $N_M$ is exceeded, as they no longer take part in the calculation procedure.

Stopping in the case of event b) avoids the result arriving when it is no longer of interest, should long waits for distances estimates, the acquisition of geographic coordinate data, the repetition of incorrectly received messages, etc. entail excessive delays.

Also in the case of stoppage following events a) and b), the process proceeds with calculating the positions, using the data acquired up to that moment, as explained the further on.

In the illustrative example used up to now, the role of controller has always remained with apparatus 119. However, in general, during the course of creating the localization network, the role of controller can pass from one apparatus to another. The change in controller can be motivated, for example, by the advantages of having the controller in a barycentric position of the localization network. Alternatively, the role of controller could systematically pass to the apparatus charged with exploration. On the other hand, it must be taken into account that the passage of the role of controller from one apparatus to another entails the transfer of the distance table and the data table, as well as the updating of the column that indicates the number of radio links that separate the apparatus under consideration from the controller apparatus, and so the advantage of performing a passage of the role of controller is evaluated by an appropriate algorithm, which compares the number of messages needed to perform the transfer of the role of controller with the estimate of the messages that would be saved in the course of the calculation procedure if the transfer was carried out.

During the development of a first localization network it can happen that, at a certain point of exploration, apparata are encountered that are part of a second localization network, and in particular apparata to be positioned that belong to a second localization network. In this eventuality, development of the first and the second localization network preferably proceeds in an independent manner. Alternatively, the two networks could be combined, with the advantage of avoiding possible duplications of data requests on the cooperators, but with the drawbacks of:

requiring that the apparata to be localized, if possible, belong to a same localization grid, more complex than the two separate ones that could be developed independently;

negotiating selection of the controller of the localization network resulting from the merge;

combining and transferring the data collected up to the moment of merging to the sole controller.

In addition, the merging of two networks, implicating the development of a more complex network, probably entails a greater number of exploration steps and a greater probability of exceeding limit $N_M$ or time $T_L$.

The preferred alternative that is assumed in the description of the process is that of keeping localization networks that possibly meet and interpenetrate separate from each other. An expert in the art can however easily imagine how the merging of localization networks takes place and the subsequent development of the localization network obtained from this merging.

By keeping the localization networks that interpenetrate separate and independent, the apparata that belong to more than one localization network respond to the queries of the different controllers in an independent manner. Possible collisions of messages coming from the different controllers are resolved by the radio transceiver system, as described in the following.

The process according to the present invention further comprises a phase of calculating the positions of the apparata to be localized.

If at the end of the localization network development process there are apparata to be localized other than the current controller, the coordinates of the apparata to be localized are preferably calculated by the controller and then transmitted to the respective apparata. Alternatively, the controller transfers all of the collected data, or a part thereof including the necessary data for calculating the respective positions, to the apparata involved and the latter individually calculate their own positions from the received data.

When development of the localization network terminates, for the purposes of calculating the positions of the apparata to be localized, the following situations can arise:

c) constraint redundancy with respect to the indispensable minimum for calculating the positions with geometrical calculations (as in the illustrative example used up till now);

d) number of constraints equal to that geometrically necessary;

e) number of constraints less than that geometrically necessary.

In case c), calculation of the positions is performed by means of an optimization algorithm that takes into account the reliability of the single data items, the absolute values of the distances found or their ratios, the uncertainties of the estimated data, whether position or distance, and the speeds with which the apparata move (values that, for the described example, can be found in the distance table in FIG. 2d and the data table in FIG. 3d).

In case d), the calculation of the positions is performed using geometrical rules well known to an expert in the art.

In both case c) and case d), errors can be caused by the following:

uncertainties in the values of collected data;

estimation errors on coordinates and distances;

coordinate and distance values measured at different times and therefore potentially inconsistent after movements of the mobile apparata.

For the above-stated causes of error, the results of the position calculations are generally affected by uncertainties and can have some inconsistency.

In case e), in addition to the causes of uncertainty existing in cases c) and d), there is at least one degree of freedom in the positioning of the apparata to be localized. The existence of degrees of freedom, or rather the lack of constraints, corresponds to areas of uncertainty regarding the positions of the apparata; in order to reduce them, the process of the invention determines limits for the positions of the apparata that are calculated considering the transmission and reception ranges and, if available, plans of the area and the lines of demarcation created by obstacles and objects present in the area.

Figure 4:
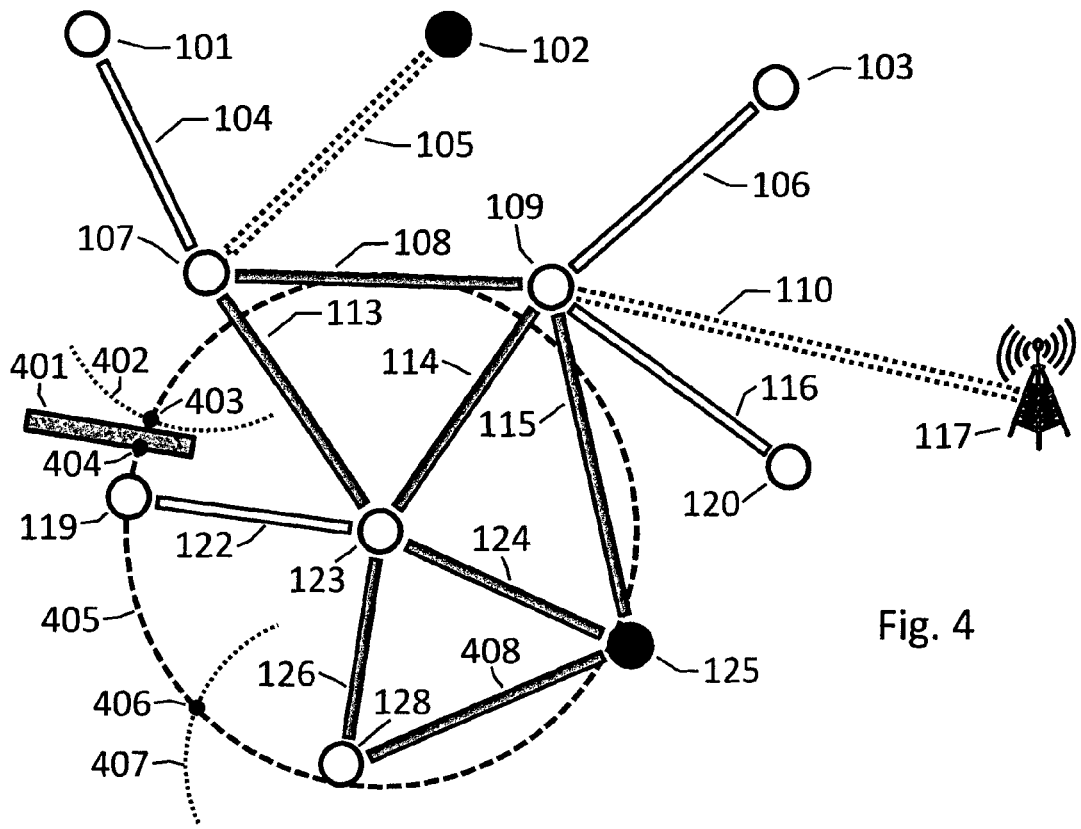
FIG. 4 shows a diagram representing an example of position calculation with insufficient geometric data.

An example is shown in FIG. 4, where FIG. 1d is portrayed without apparata 111 and 127 and without distances 112, 118 and 121, while distance 408 has been added, as apparatus 128 is now closer to apparatus 125. Distance 112 is not present because in FIG. 4 it is assumed that apparatus 119 is further away from apparatus 107 and that there is an obstacle 401 that blocks the radio waves on the path between apparatus 119 and apparatus 107. The apparatus to be localized is still the one identified by reference numeral 119. The grid of triangles 109, 107, 123, 128 and 125 is geometrically positioned, as its node 125 is positioned and there is the constraint of distance 105 from apparatus 102. Apparatus 119 is, however, only constrained to the localization grid at apparatus 123 by distance 122, and therefore from the geometrical viewpoint, its position can be at any point of the circumference 405, which has apparatus 123 at its center and a radius equal to distance 122.

The controller (in the example, apparatus 119 itself), can however work out that apparatus 119 cannot be on the arc of circumference 405 that runs from near node 128 to near node 125, because this arc is close to the line joining the two nodes 128 and 125, which are mutually electromagnetically visible; therefore, if apparatus 119 were to be on this arc, it could establish a radio link with at least one of the two said nodes 128 and 125, and could estimate the respective distance from them. Similarly, the controller can work out that apparatus 119 cannot be on the arc of circumference 405 that runs from near node 125 to near node 109, or on the arc that runs from near node 109 to near node 107. Therefore, in light of the calculations made up to this point, apparatus 119 must be on the shorter of the two arcs of circumference 405 delimited by nodes 107 and 128.

The controller can also calculate the transmission and reception range of nodes 107 and 128, conservatively calculating it in the case where propagation is impeded by obstructions. In FIG. 4, this range is represented by the arcs of circumferences 402 and 407 for node 107 and node 128 respectively. The radius of these arcs would naturally be larger if the attenuation introduced by the possible presence of said obstructions was not taken into account in the calculations. Arcs 402 and 407 intersect circumference 405 at points 403 and 406 respectively and so, in the light of the calculations performed up to this point, apparatus 119 should be on the shorter of the two arcs of circumference 405 delimitated by points 403 and 406.

Finally, if the controller has a map of the area and detects from this the presence of obstacle 401 and the absence of other obstacles between obstacle 401 and node 107, it can calculate that the range of node 107 arrives up to obstacle 401 and therefore that the possible position of apparatus 119 closest to that of node 107 is represented by point 404. The final result of the calculations indicates that apparatus 119 is on the shortest of the two arcs of circumference 405 delimitated by points 404 and 406. Then, taking into account the uncertainties on the position of the grid of three triangles 109, 107, 123, 128 and 125, and of the consequent uncertainties of the positions of nodes 123 and 128 in particular, and also taking into account the uncertainty in measuring distance 122, the controller can calculate the area of uncertainty of the position of apparatus 119.

Lastly, taking into account the probability distribution of the quantities affected by uncertainty, by means of statistical processing known to an expert in the art, the controller calculates the most likely value of the position of apparatus 119 and the statistical parameters that characterize the spatial distribution.

The example described with reference to FIG. 4 demonstrates that it is possible to substantially limit the areas of uncertainty even if the number of constraints on the positions of apparata or the localization grid is less than the indispensable minimum for Euclidean geometry.

Thus, in all three cases c), d) and e) it is possible to calculate and limit positioning uncertainties and geometrical inconsistencies.

If uncertainties in the results and any inconsistencies are within acceptable limits, the controller provides the positioning result to the requesters, otherwise the controller, by multiplying the speed with which the mobile apparata move by the time differences to which current data refers, calculates the uncertainty factors that result from this and evaluates whether it is necessary to update all or just part of the available data. If an update is considered necessary, the controller sends an update request to the cooperator apparata that must update the data for which they are responsible, specifying the time when data acquisition must be performed so that whatever the delays occurring between emission of the request and taking the measurements, the measurements refer to the same instant. Also in this case, the controller takes into account transmission delays and misalignment of the clocks of the apparata, as explained further on, when sending the update request. Once the data is updated, the controller calculates the requested positions and the related uncertainties. If the uncertainties of the results and any inconsistencies are within acceptable limits, the controller provides the positioning result to the requesters. Otherwise, if time limit $T_L$ has not been exceeded, it resumes development of the localization network and performs a further exploration step in the network development phase, as already seen above. When this further exploration step terminates, the localization network development phase also terminates again and the phase of calculating the coordinates of the apparata to be localized is consequently entered.

Instead, if time limit $T_L$ has been exceeded, the procedure continues by providing the requesters with the obtained positioning results and the related uncertainties, together with a warning regarding the reliability of the result and the request for users and entities that requested positioning information to indicate whether or not they are interested in refining the calculations. If interest in refining is expressed by at least one requester, the process is resumed at the step of performing a further exploration to develop the localization network. The time limit is reset, preferably to the same value as before $T_L$ or to a new value, and the requesters that renounce to positioning are struck off the list of requesters.

If necessary, the reiterations continue until there are no longer any requesters that confirm interest for the result.

Following updates or subsequent developments of the localization network due to the changed conditions, caused for example by movements of the mobile apparata, it can happen that previously detected apparata or distances are no longer found. In these cases, the missing apparata and data are removed from the tables and the procedure continues as if they had never existed.

Figure 5:
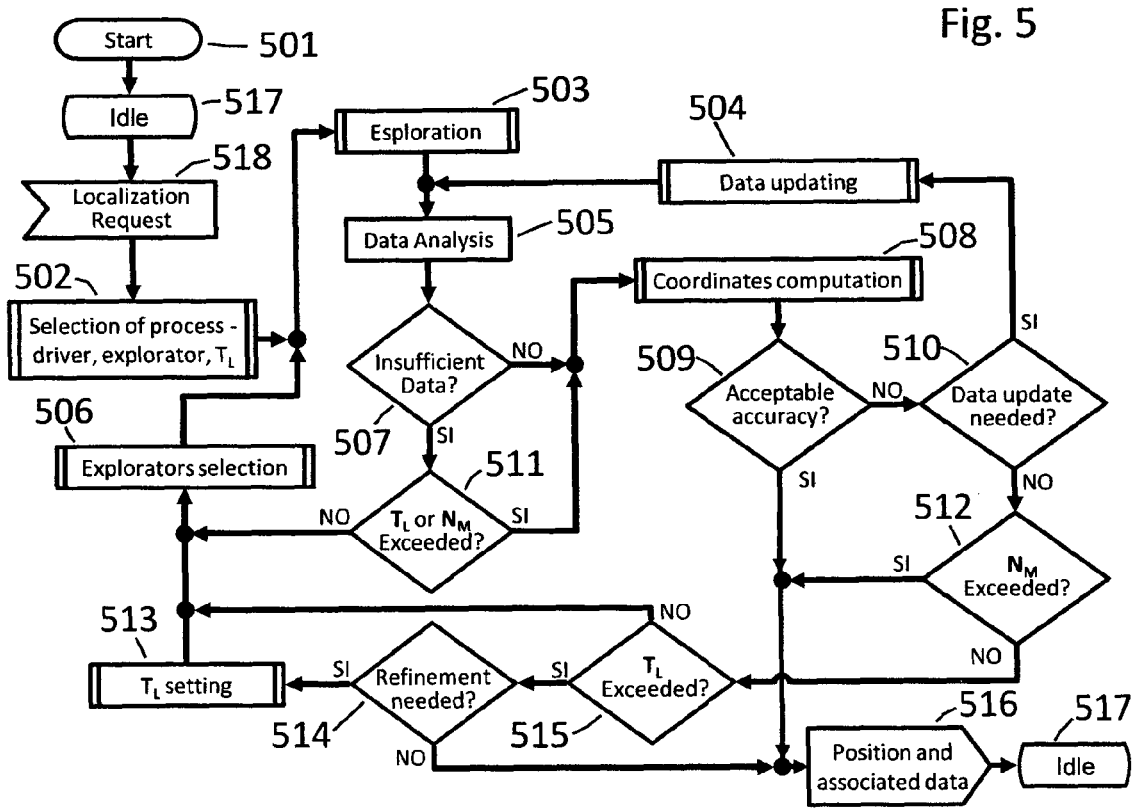
FIG. 5 shows a flowchart regarding a procedure for calculating the positions of apparata.
Figure 6:
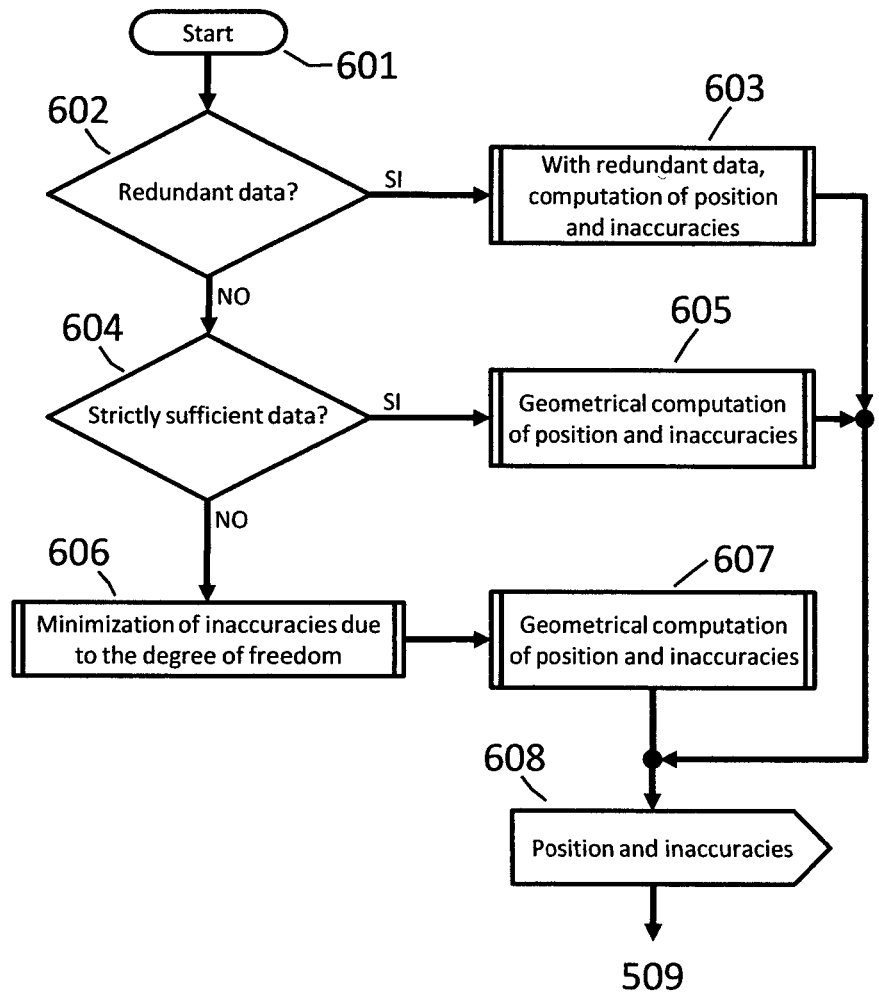
FIG. 6 shows a flowchart regarding a procedure for calculating geographic coordinates.

In particular, the flowcharts in FIG. 5 and FIG. 6 illustrate the steps of creating and developing the localization network and of calculating the positions of the process according to the present invention.

FIG. 5 represents the overall scheme of the procedure, from the start (step 501), when the procedure begins, to the end (step 516), when the results are made available to the apparatus that requested them, which in the illustrative example coincides with controller apparatus 119.

Step 517, represents the wait state of a position calculation request. For simplicity, checks have been omitted regarding the possibility of obtaining the requested position by means of a conventional localization system, assuming on principle that there is no possibility of accessing any of them, or that they have failed, or have supplied unsatisfactory information the correctness of which it is wished to check by means of an alternative localization process.

When a localization request arrives (step 518), control passes to step 502 where the initial settings are assigned, which can be partially or completely predefined without intervention by the user requesting localization, or can be assigned by any means of man-machine communication interface. In particular, both the role of controller and the role of explorer are assigned to the apparatus on which the process begins. The time limit $T_L$, beyond which the process stops to ask positioning requesters if they are still interested in the continuation of the calculations, is preferably predefined, but can also be requested from the positioning requester by means of the above-mentioned interface.

With the data set up in step 502, the exploration step 503 is started, from which data on the respondents and the distances that separate the explorers from the respondents are obtained. No check is provided downstream of the exploration step 503 on the possibility of there not being any respondents to the exploration, as this case is implicitly dealt with by the procedure as a whole, as will be seen further on.

Now, assuming that there are respondents to the search signal, whether dealing with the first exploration carried out by the controller at the beginning of the localization process, or dealing with a generic exploration carried out during the course of the subsequent expansions of the localization network, the data collected in the exploration step 503 is analyzed in step 505 and, using the results of this analysis, it is checked (step 507) whether there is sufficient data to geometrically calculate the requested positions. If the available data is not sufficient to geometrically calculate the requested positions, it is checked (step 511) whether time $T_L$ or limit $N_M$ for the maximum number of apparata that can be involved in the procedure have been exceeded. If neither $T_L$ nor $N_M$ has been exceeded, control passes to the step of selecting the explorers 506 to carry out a new step of expanding the localization network. As shall be seen below, the explorer selection step 506 also allows an apparatus that has already assumed the role of explorer in the past to be selected, but only if a time equal to at least $T_E$ has passed since this role was last assumed. In general, $T_E$ is less than $T_L$ and is sized to avoid, on the one hand, an excessively frequent repetition of the cycle formed by steps 503-505-507-511-506, and to allow, on the other hand, to reconsider cooperator apparata as explorers even if they have already had this role, so as to be able to examine changes in environmental conditions following movements of the apparata or other objects.

Returning to the flowchart in FIG. 5, having selected the explorers (step 506), an exploration is carried out (step 503) and the available data is analyzed (step 505). Now, assuming that the constraints are no longer insufficient to geometrically calculate the requested positions, control passes from step 507 to step 508, which is described further on with reference to FIG. 6. Having calculated the positions, with the related uncertainties that also take into account any inconsistencies caused by position and distance estimation errors, in step 509 in FIG. 5 it is checked whether the uncertainties are acceptable. If the uncertainties are acceptable, the result is supplied (step 516) and the process terminates. Instead, if the uncertainties are not acceptable, it is checked (step 510) whether the data has been acquired at times that are too different or too old with regard to the possible environmental changes (movements of apparata and objects). If there is data to be updated, it is then updated (step 504) and step 505 re-entered to analyze the available data. Instead, if there is no data to update, control passes to step 512, where it is checked whether $N_M$ has been exceeded. If $N_M$ has been exceeded, the process terminates at step 516, supplying the achieved results and a warning that the supplied results are affected by uncertainties beyond acceptable limits. Instead, if $N_M$ has not been exceeded, control passes to step 515 where it is checked whether time $T_L$ has been exceeded.

If time $T_L$ has not been exceeded, control returns to step 506 to select a new explorer and make another attempt to expand the localization network, as already seen. Instead, if time $T_L$ has been exceeded, control passes to step 514 where it is checked whether the positioning requesters are interested in refining the calculations. For illustrative simplicity, the steps of sending provisional results to the positioning requesters, presenting the query on interest in refining the results and waiting for the response are not represented in FIG. 5. Nevertheless, an expert in the art is capable of imagining what the steps are that have been omitted in this and other points of the flowchart in FIG. 5 for simplicity of graphical representation. Returning to step 514 in FIG. 5, if there is interest in refining the results, $T_L$ is reset (step 513) and control passes to the explorer selection step (step 506) to make a new attempt at expanding the localization network. Instead, if there is no interest in refining the results, the procedure ends with the supply of the acquired results (step 516). The cases where there are no respondents to the search signal in the exploration step 503 will now be considered. If there are no respondents to the first search signal emitted by the controller, through analysis of the available data (step 505) and the step 507 of determining the sufficiency or insufficiency of the acquired data to geometrically calculate the positions, control arrives to the step 511 of checking whether time $T_L$ or number $N_M$ have been exceeded. If neither $T_L$ nor $N_M$ has been exceeded, control passes to the explorer selection step 506. As no data has changed for the controller, apart from time of the most recent exploration, the role of explorer is reassigned to the same apparatus, namely to the controller itself, but, as has been said, after time $T_E$ from the previous assignment of the same role. The cycle of steps 503-505-507-511-506 is thus repeated until different conditions are found, either because the environmental conditions or the distances of apparata present in the vicinity have changed so that some respondent to the search signal is found, or because $T_L$ or $N_M$ has been exceeded.

If respondents to the search signals are found, the situation falls back to the general case described above. Instead, if no respondents are found and $T_L$ or $N_M$ is exceeded, control passes from step 511 to that of calculating the coordinates (step 508), which obviously does not provide useful results, and so control then passes from step 509 to step 510. As there is clearly no data to update, control passes to step 512. If $N_M$ has been exceeded, the process terminates at step 516 with the supply of the achieved results and a warning that the uncertainties are beyond acceptable limits. Instead, if $N_M$ has not been exceeded, control passes to step 515 and the procedure continues as in the general case described above.

When there are no respondents to search signals emitted by apparata other than the controller, after the exploration step 503, apart from the more recent time of exploration, only data regarding the distances between the apparata involved in the transmission and reception of the exploration procedure's messages can change, and therefore the geometrical constraints of the localization network do not change and the first pass through steps 503-505-507-511 develops as in the case seen above, where there are no respondents to the first search signal broadcast by the controller. Whereas, on step 506, if there are a number of apparata likely to become selected as an explorer, the set of explorer apparata can change and it is possible to return to the previously seen, more general case, where there are respondents to the search signal. Instead, if the role of explorer is reassigned in step 505 to the same apparata, respecting time interval $T_E$ from the previous assignment, the exploration is reiterated as in the case of no respondents to the first search signal broadcast by the controller.

If the cycle 503-505-507-511-506 is exited at step 511 due to $T_L$ or $N_M$ being exceeded, the general case of the positions calculation procedure would be entered at step 508, with all of the alternatives already described above, including the possibility of finding acceptable uncertainties in step 509 and terminating in step 516 with the supply of the results to the apparata interested.

The step of selecting the explorers 503, as already explained in the illustrative example provided above, comprises numerous criteria, which are applied according to the status of the network and data at the time of acquisition. Some examples, neither exhaustive nor limitative, of preferential conditions and criteria for selection of an apparatus for the role of explorer are:

apparatus that has localization means;
apparatus geographically distant from apparata that have localization means, but not the possibility of directly acquiring their own position;
apparatus geographically close to apparata that do not have localization means;
apparatus coincident with a node of the localization grid;
apparatus that has not assumed the role of explorer for at least time $T_E$;
fixed apparatus;
mobile apparatus with a low speed of movement.

It should also be remembered that, preferably, the role of explorer cannot be assigned to apparata that have a number of radio links from the controller equal or greater than $H_M$. The exploration step 503 has been described with the illustrative example explained above. Additional details are given further on in connection with the description of the radio transceiver system.

The data analysis step 505 consists in the application of known mathematical and geometrical criteria with which it is determined whether the found constraints are sufficient to calculate the requested positions by geometrical means.

The data update step, already described with the illustrative example, consists in requesting apparata that have provided potentially out-of-date data to update the measured values, which are then forwarded to the controller apparatus 119 for collection and analysis, according to the process already described in the foregoing.

The positions calculation step has been described above in the illustrative example, also with regard to FIG. 4. FIG. 6 provides a schematic representation.

As has been stated in the course of explaining the illustrative example, the positions calculation step (step 508 in FIG. 5) can be undertaken with a redundant number of geometrical constraints, with a strictly sufficient number of geometrical constraints, or with an insufficient number of geometrical constraints. In FIG. 6, after the initial step 601, it is checked whether the number of geometrical constraints is redundant (step 602). If the number of geometrical constraints is redundant, the localization network data passes through an optimization algorithm that, based on all of the available data and the respective uncertainties, determines the most likely position of each apparatus to be localized and calculates the uncertainties related with these calculated positions, if necessary with statistical characterization parameters (step 603). The uncertainties and statistical parameters also take into account possible discrepancies that may be caused by estimation errors in the values contained in the localization network data. These errors have the effect of amplifying the areas of uncertainty of the results. Lastly, in step 608, the obtained results are output to the next step 509 for checking the acceptability of the uncertainties. If the number of geometrical constraints is not redundant, control passes to step 604 from where, if the number of geometrical constraints is strictly sufficient, the localization network data passes to the positions calculation step 605 for determining the positions by geometrical calculations. Also in this case, the uncertainties of the calculated positions are calculated taking into account the uncertainties of the localization data and any inconsistencies, as mentioned above with regard to the case of redundant geometrical constraints. The obtained results are output in step 608.

If the number of constraints is found not to be strictly sufficient in step 604, control passes to step 606, where the lack of constraints with respect to the indispensable minimum to geometrically calculate the positions is first of all translated into areas of uncertainty. In the case of the illustrative example represented in FIG. 4, by using a system of polar coordinates centered on the position of the node constituted by apparatus 123, the lack of a constraint at the position of apparatus 119 is initially made to correspond to a total uncertainty on the angle coordinate of the position of this node 119. After the considerations made in explaining this example, the uncertainty of this angle coordinate is reduced to the convex angle delimited by the half-lines leaving the position of node 123 and passing through points 404 and 406. As has been done in the illustrative example mentioned above, step 606 in FIG. 6 minimizes the uncertainties resulting from the lack of constraints by delimiting the areas of uncertainty with limits derived from the transmission and reception ranges and obstructions present in the area. Step 606 is followed by step 607, which calculates the positions to be determined with algorithms similar to those of step 605, but more comprehensive to also deal with large uncertainty values. Lastly, the results are output in step 608.

The present invention also relates to a cooperative localization apparatus comprising at least one radio transceiver system for exchanging data packets between the apparata: usefully, this radio transceiver system need not necessarily be designed ad hoc, but can be one of the known systems, as shown further on, as long as it has the following characteristics:

possibility of direct apparatus-to-apparatus transmission of short data packets;
  availability of mechanisms for handling radio packet collisions;
  adequate transmission and reception range for the operating conditions contemplated for the application of interest;
  possibility of estimating the distances between apparatus and apparatus of the requested positioning service;
  possibility of making the receivers operate with low energy consumption.

By way of example, if the process of the present invention is applied for the localization of mobile phone apparata in emergency situations, the required transmission and reception range could be in the order of 30-40 m indoors and 100-150 m outdoors, while, if the positions of the apparata must have an uncertainty within ±10 m, the uncertainty of the distance measurements must be approximately ±2 m, to take into account the various causes of error that combine with each other, including those induced by anomalous propagation conditions.

Obviously, as already stated, the distances can be estimated using one of the known process of the art.

Figure 7:
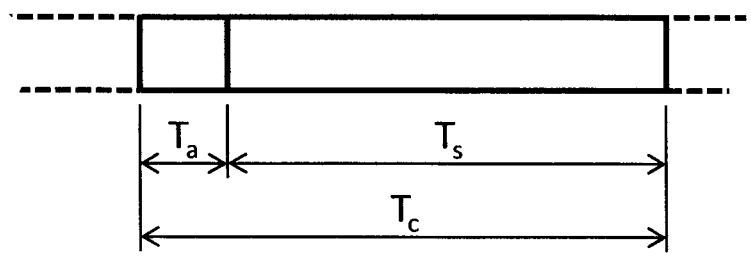
FIG. 7 shows a diagram representing a receiver on/off cycle in sleep mode.

With regard to the energy consumption of the receivers, techniques similar to those used in many systems are applied, known to experts in the art with the term "sleep mode". According to these techniques, the receivers have two modes of operation, an "active mode" in periods when they are engaged in cooperative localization and a "sleep mode": in active mode, the circuits of the receivers are constantly powered to promptly respond to requests to provide data or to send messages, while in sleep mode, the circuits of the receivers are cyclically switched on for a time $T_a$ and switched off for a time $T_s$, in a repeated cycle lasting time $T_c$, where:

$$T_c = T_a + T_s$$

as shown in FIG. 7.

The receivers pass from sleep mode to active mode when an alert signal, described below, is received, while they pass from active mode to sleep mode after a time equal to $T_W$ has passed since the respective apparatus was last engaged in the transmission or reception of messages or data regarding a cooperative localization procedure. Instead, the receiver of the controller apparatus preferably passes to sleep mode when the cooperative localization procedure in course terminates.

Instead, the transmitter of each cooperator apparatus is normally always switched off and is only activated for transmitting data packets when:

the apparatus must emit said first search signal at the beginning of the procedure for calculating its own position, as it does not have access to systems that can supply it directly;
  the apparatus receives a request from a controller to transmit the necessary messages for the localization of another apparatus.

The emission of signals by the controller will continue until the calculation step for the positions to be determined ends. As the other apparata do not emit signals unless commanded to do so by the controller, when the controller stops emitting, it follows that all of the cooperator apparata also stop emitting.

The passage of the receivers from sleep mode to active mode can be achieved in various ways.

As a non-limitative example, the search signals and, in general, all signals directed to apparata that have remained inactive for a time greater than $T_W$, are constituted by a preamble followed by the information content. The preamble contains an "alert code" known to all the receivers of the apparata with the characteristic functionality of the process of the present invention, lasting time $T_p$, less than $T_a/n$, where n is an integer greater than one. This alert code is repeated for a number of times equal to at least the integer higher than the ratio $nT_a/T_p$. In this way, in the interval $T_a$ of periodic receiver switch-on, n repeats of the alert code occur, of which n−1 are definitely not interrupted, while one might possibly be composed of an initial part of a first repeat and an end part of a second repeat. The possibility of receiving multiple repeats of the alert code in interval $T_a$ allows the probability of non-detection or false detection of the alert code to be reduced. On the other hand, having set the duration of the alert code, the greater the number of repeats that can arrive in interval $T_a$, the greater will be the duration of $T_a$. After receiving and decoding the alert code, the receiver passes from sleep mode to active mode.

Each message transmitted over the radio channel contains information on the addressees and, in particular, contains a data field that indicates whether the message is intended for "all" the apparata that receive it or if instead it is intended for only the apparata of a defined set. In this way, apparata that are not amongst the message's addressees do not emit any message, in order to avoid a pointless, domino-effect multiplication of messages not needed for achieving the localization of apparata that have requested it.

The main types of message are those listed below, by way of non-limitative example:
  m01: request all apparata to send a reception acknowledgement, the response for which must be addressed to just the acknowledgement requester;
  m02: exploration request, which implicates the emission of a m01 request and returning the collected data to the requester;
  m03: data request (distances, polar coordinates, etc.);
  m04: request all apparata to send a reception acknowledgement, the response for which must include an m01 request;
  m05: reception acknowledgement.

There are also the response messages for these messages m01÷m05 and others not listed for brevity.

The data items available in the data table and in the distance table are characterized by the time when they were detected. These times must refer to a common time, whilst the clocks of the apparata can be misaligned. Techniques known to an expert in the art can be used to align these times to a common reference. For example, each apparatus, instead of transmitting the time according to its own clock when it performed a certain measurement, transmits the amount of its own processing time, defined as the duration of the time interval between the moment when it performed this particular measurement and the time when the signal carrying the value of this particular measurement was emitted from its antenna. To this processing time, the cooperators, which are inserted like repeaters (relay apparata) between the cooperator that originated this value and the controller, each add their own processing time, or rather the time that runs from reception of the signal carrying this value on its receiving antenna to the retransmission of the signal carrying this value from its transmitting antenna. The controller adds its own processing time to these processing times and also adds the time taken by the electromagnetic waves to travel over the radio links through which the signal arrived, as their lengths are known. In this way, the controller calculates the total time between the instant when this particular measurement was taken and the instant when this particular measurement became available for processing. The controller, for example, by subtracting this total time from the time indicated by its own clock, obtains the instant in time of this measurement with reference to the time indicated by its own clock, and it can repeat this for every other measurement. In the case where, during the positions calculation procedure, the role of controller passes from a first apparatus, with a first clock, to a second apparatus, with a second clock, possibly misaligned with respect to the first, the first apparatus converts the times stored in its own data table and distance table into time differences with respect to its clock, assumed as the reference clock, and transmits these tables with these time differences. Transmission takes place in the same way as seen above for transmission of the value of this particular measurement, so that the second apparatus can make all the stored times refer to said second clock.

Symmetrically, when the controller sends a request to a cooperator to update a measurement value at a set time, it does not send the value of this set time with reference to its own clock, but sends the time delay, running from the time when this cooperator receives the request, after which the measurement must be taken. In a similar way to the case seen above regarding the communications of reference times from cooperators to controller, the controller transmits a delay value that takes into account its own processing time and the times taken by radio propagation, while the cooperators through which said request signal is possibly relayed, subtract their own processing time from the delay value found in the message they receive, and forward this request message with said delay value so corrected.

It should be underlined that in the system according to the present invention, any apparatus, fixed or mobile, which is equipped with a specific radio transceiver system for the process of the present invention, can become an active cooperator apparatus, or rather assume the role of controller or explorer.

A preferred embodiment of the system according to the present invention is the implementation of the previously described process in mobile phone terminals that, in addition to having the proper radio transceiver system of the cellular network to which they are affiliated, also have the radio transceiver system known by the name of "Wi-Fi Direct" or "Wi-Fi Peer-to-Peer" or "Wi-Fi P2P".

As is known to an expert in the art, Wi-Fi P2P enables direct communications between apparata with a range of approximately 40÷150 m, depending on the conditions of propagation. Furthermore, its transmission and reception system has quite a good capacity to recover received packets damaged due to poor propagation conditions, signal insufficiency, interference and packet collisions. Wi-Fi P2P therefore has adequate performance for implementation of the process of the present invention.

Many types of mobile phone terminals are already equipped with Wi-Fi and so, with the addition of appropriate software modules, these types of terminals can implement the process of the present invention in combination with the processing, storage and distance calculation means provided for therein. All apparata equipped with Wi-Fi P2P, including Wi-Fi access points, personal computers equipped with Wi-Fi and all peripherals (printers for example) equipped with Wi-Fi for data transfer, can also become cooperators in the step of calculating the position of one or more of said mobile phone terminals.

In the description given above, it has been assumed that the number of apparata involved in the localization process and the number of messages transmitted via radio preferably have to be minimized. To achieve this objective, the emission of search signals is limited to one apparatus at a time, so as to be able to decide on the need to launch any further exploration steps after having collected and analyzed the data of those already carried out. If it is wished to reach the result more rapidly, possibly renouncing to maximum efficiency in terms of number of messages and number of apparata involved, at a certain exploration step, a search signal can be emitted to a number of apparata at the same time, so as to simultaneously collect a larger amount of data.

In the illustrative example it has been assumed that the controller apparatus 119 builds a localization network by means of radio messages that the cooperator apparata exchange, and that it checks at each development step of said network whether it is capable of calculating the position of the apparatus to be localized on the basis of the collected data. Furthermore, in the case where calculation is impossible, it is the controller apparatus that actually estimates the position, or positions, to be determined through specific processing and storage means, if necessary using approximation and optimization techniques, according to the completeness and precision of the available data. In alternative, it is possible to make the controller apparatus 119 send the collected data to another apparatus that it can reach, by any means of communication, and transfer the task of performing the calculations to the latter. Said apparatus that performs the calculations then sends the results to the controller apparatus, which maintains control of the procedure and, in particular, establishes whether to terminate the localization procedure or continue to follow it.

Although Wi-Fi P2P lends itself very well to implementing the process of the invention, in the long term the radio transceiver system could be made ad hoc, or developed also taking into account the specific requirements of security and short message services. There are many Machine-to-Machine applications with these requirements, for which important markets are foreseen and which could advantageously share the radio transceiver system with the process of the present invention. There are also research proposals for a radio-signalling network that satisfactorily handles, in a generalized and universal manner, the transmission and reception of the messages necessary for accessing wireless telecommunications networks and for negotiating the performance of transmission and reception prior to the assignment of traffic channels. The requirements of this type of network blend well with those of the invention under discussion and so, if such a network were to be implemented, the transceivers would be found in a great many apparata, both mobile and fixed, rendering the process of the present invention implementable on a very large scale with minimum marginal costs.

For descriptive simplicity, the description of the invention has assumed that all of the elements belonging to the localization system and involved in the related localization process lie on a plane, but it obvious to an expert in the art that the process could be applied equally well to a three-dimensional space, i.e. not considering just longitudes and latitudes, but also the altitudes at which the apparata and points of reference are located. Again, for descriptive simplicity, the distinctions between active cooperator apparata, passive cooperator apparata and inert cooperator apparata have not been commented on up to now. Nevertheless, in general, these three types of apparatus can be part of the "localization network" and cooperate in the positions calculation procedure, and have the below-described characteristics.

Active cooperator apparata are equipped with the following means:
 a first radio system for direct, apparatus-to-apparatus transmission and reception of messages and data;
 means for estimating the distance of other apparata that are electromagnetically visible;
 storage means;
 processing means, which can optionally comprise optimization algorithms.

In addition, active cooperators can optionally have data on their own position. Active cooperator apparata, by having all of the specific means of the process of the present invention, can assume the role of controller, the role of explorer and the role of relay apparatus.

Examples, neither exhaustive nor limitative, of apparata that could become active cooperators are Wi-Fi P2P terminals endowed with the characteristic functionality of the present invention, and mobile phone terminals equipped with Wi-Fi P2P and the characteristic functionality of the present invention.

Passive cooperator apparata are apparata that have data on their own position, but are not equipped with the specific means of the process of the present invention. They therefore cannot assume the role of controller, the role of explorer or the role of relay apparatus.

Passive cooperators are equipped with at least a second two-way radio system, not necessarily different from the first radio system. This second radio system enables:
 exchanging data and messages with active cooperators also equipped with this second radio system;
 estimating, by active cooperators also equipped with this second radio system, the distance corresponding to the propagation path of the signals with which said data and messages are exchanged with the active cooperators.

Passive cooperators can optionally be capable of estimating the distance corresponding to the propagation path of the signals with which said data and messages are exchanged with the active cooperators and sending these estimates to the latter.

Examples, neither exhaustive nor limitative, of apparata that could become passive cooperators are:
 radio base stations of cellular systems;
 radio base stations of WiMax systems;
 Wi-Fi Access Points;
 Personal computers equipped with one or more bi-directional transmission and reception systems, such as Wi-Fi P2P, Bluetooth, or ZigBee;
 in general, all apparata that have means to establish two-way connections with other apparata, but are unable act as a controller or explorer.

In the illustrative example used above to describe the process of the present invention, apparatus 117, shown in FIG. 1d with a picture of a pylon with an antenna, can be considered a passive cooperator. In particular, it can be assumed that apparatus 117 is a cellular base station of an LTE network. In this case, the signal emitted by apparatus 117 can allow apparatus 109, which receives it, to estimate the distance 110 between apparatus 109 and apparatus 117. In addition, apparatus 117 can transmit data on its own absolute position to apparatus 109 via one of the normal cellular connections that can be established between apparatus 117 and apparatus 109.

Alternatively, apparatus 109, after having identified the code of the base station 117, which it broadcasts in its area of coverage, can retrieve the data on the position of apparatus 117 from a database accessible to apparatus 109.

Inert cooperator apparata are apparata only equipped with means that enable active cooperators to detect their presence, to estimate the distance from them and to indirectly obtain data on their position. Said data on the position of an inert cooperator is intended as being found indirectly as the active cooperator, after having read the identification code of the inert cooperator, retrieves the data position of the latter from a database accessible to the active co-operator and not provided directly by the inert cooperator, but acquired from other information sources.

Obviously, inert cooperators cannot assume the role of controller, the role of explorer or the role of relay apparatus. Examples, neither exhaustive nor limitative, of apparata that could become inert cooperators are apparata incorporating RFID (Radio Frequency IDentification) and for which the position can be provided.

Here is an example of inclusion of an inert cooperator in a localization network: when an active cooperator equipped with an RFID reader and with the possibility of accessing an "RFID database" assumes the role of explorer, it activates its RFID reader and, upon a command originated by the controller, emits a search signal via the RFID radio system; if the explorer detects the presence of an RFID device, it queries this "RFID database" and, if this database of RFID devices has the absolute position data of this apparatus equipped with RFID, it will include the object identified via this RFID read in the inert cooperators, with the position of said object acquired from said "RFID database". In addition, the active cooperator estimates its own distance from the RFID device based on the level of the signal it receives and the type of RFID that emits this signal (e.g., unpowered RFID, RFID equipped with internal battery, RFID equipped with a power system connected to an electricity grid) and/or the radio emission characteristics of the RFID device, if known. As the distances within which RFID devices can be detected are normally small, the absolute error on the estimated distance of an RFID is small. Alternatively, the position of the RFID device can also be made available to the explorer in other ways, such as, for example, the transmission of said position in a particular area around the RFID device in messages emitted by other radio transceiver apparata that the explorer can receive and use. Returning to the illustrative example, let it be assumed that the explorer apparatus 107 in FIG. 1*c* is equipped with an RFID reader and that apparatus 102 is an apparatus incorporating an RFID having a maximum transmission range of 3 meters. Following reception of a search command via a given radio system, for example Wi-Fi Direct, the active cooperator 107, in the role of explorer, also emits the search signal via the RFID radio system and receives a response from RFID device 102, which responds by sending its identification code. The explorer 107 can then identify the absolute position of this device 102 by consulting a local or remote database that associates the identification code of the responding device with its absolute position. The active cooperator 107 estimates the distance 105 that separates it from apparatus 102 using any known process (for example, response delay, range information, power of received signal, etc.) and transmits said distance and the position of apparatus 102, which has become an inert cooperator, to the controller, using the modes seen above.

The classification of the apparata into one of the three above-stated types (active, passive and inert) can optionally be indicated by a specific column of the data table, which has not been previously mentioned for descriptive simplicity. This column is part of the set of columns that are grouped under the "Auxiliary data" heading in the data table shown in FIGS. 3*a*-3*d*.

Figure 8:
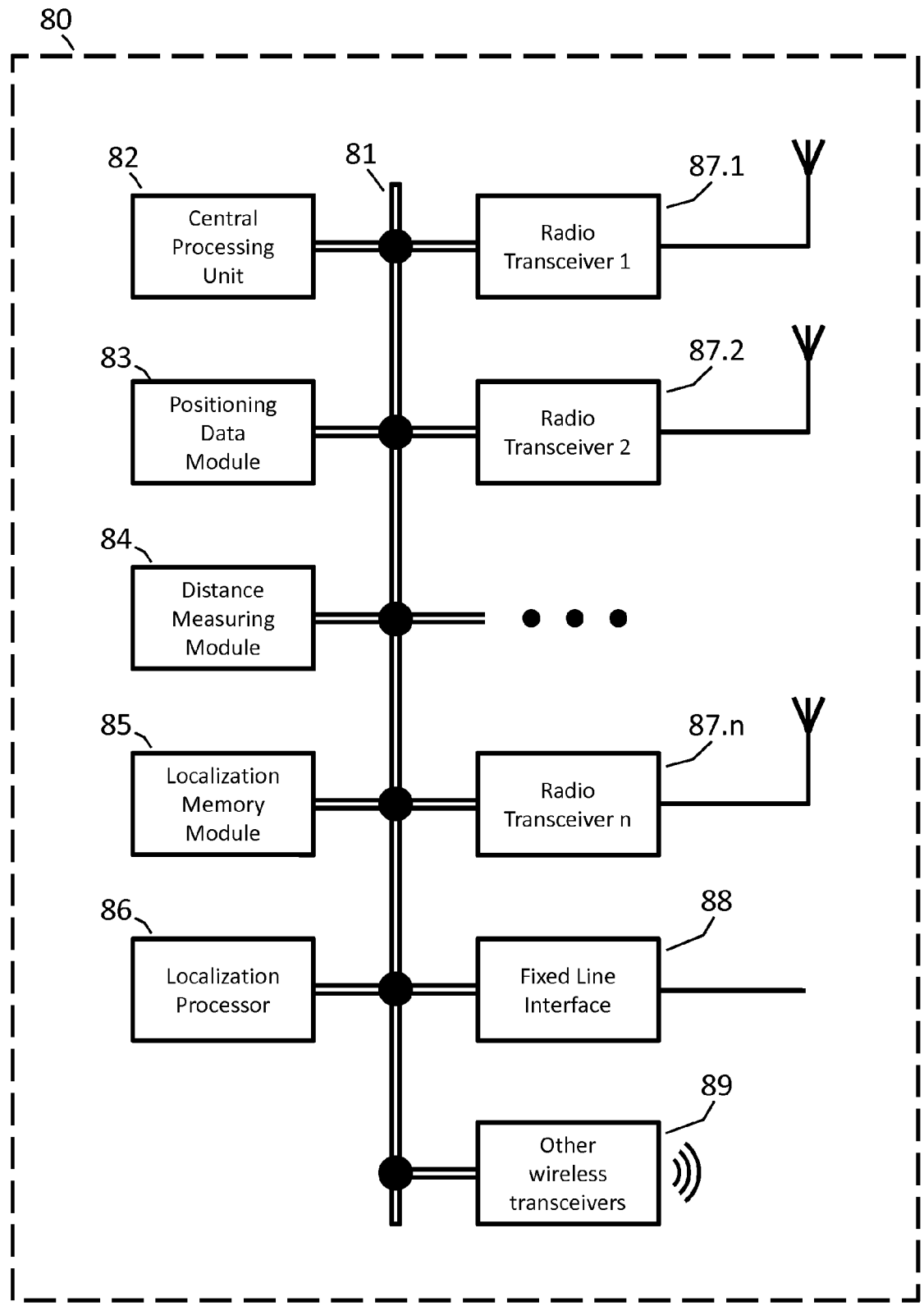
FIG. 8 shows a block diagram of an apparatus configured to assume all the roles that apparata can take according to embodiments the invention.

A simplified block diagram is shown in FIG. 8, which relates to an apparatus 80 of the active type, configured to assume all the roles of embodiments of the present invention (controller apparatus, cooperator apparatus, explorer apparatus, relay apparatus). The apparatus 80 may include a number of modules that are interconnected through Bus 81, which carries the data traffic and the electric energy too. For the sake of simplicity, the Power Module is not shown.

The apparatus 80 includes a number or Radio Transceivers 87.1 . . . 87.*n* as current smart phones or tablets have. Those devices in fact may have a GSM radio transceiver, a WDCDMA radio transceiver, a Bluetooth radio transceiver, an LTE radio transceiver, and a Wi Fi radio transceiver all together. They can have an RFID transceiver as well and possibly ZigBee and other kinds of radio transceivers currently under development or foreseen for the future. Other apparata 80, such as Radio Base Stations or Wi Fi Access Points, may have Fixed Line interfaces 88 to connect with fixed networks. Additionally, as the expert in the art knows, other communications technologies (89) can be employed (e.g. Infrared). The transceiver modules 87 89 allow the apparata of the localization network to interconnect and exchange data.

For the sake of simplicity each of the Radio Transceivers 87.1-87.*n* are shown with a single separate antenna, however, in many cases, several radio transceiver may share a common antenna system.

For communications needs, an active cooperator includes at least two radio transceivers, of the same type or of different type, in order to be able to act as a relay apparatus. An example of a similar functionality is the capability of many current smart phones to act as a Router Wi-Fi, by getting, e.g., an Internet connection through LTE on one side, and offering Internet through Wi Fi on the other side.

A Central Processing Unit (CPU) 82 manages the operation of the apparatus and generally executes the calculation algorithms including distance estimation. For clarity, in FIG. 8 a specific separate Localization Processor 86 is shown, to highlight that the operation and features of embodiments of the present invention can be added to a large number of device types, regardless they original scope. In one example, what the Localization Processor executes, can be implemented in CPU 82 as well. For similar reasons a Localization Memory Module 85 is shown, to illustrate that the data to store for carrying out the localization process may need a storage capacity. However, such a memory space may be found within the memory modules that the devices generally have for other purposes. The Distance Memory Module 84 is used for the process of embodiments of the present invention. As said above, this module can be implemented by various techniques. The Positioning Data Module 83 provides data on the absolute position of the apparatus. A typical example of a Position Module 83 is a GPS (Global Positioning System) receiver. Another example is a simple data memory where some positioning data of a fixed apparatus are stored. It is to be appreciated that this data memory may reside in the apparatus itself or may reside in an outside database that can be interrogated using an identity code of the relevant apparatus.

A Positioning Data Module 83 is not strictly needed in all the active cooperators, or in the apparatus that acts as a controller. Moreover, even if a Position Data Module 83 is inside an apparatus, the relevant apparatus and the localization network have to be able do without it, as that Positioning Data Module 83 may not work for some reason, as in the case of a GPS receiver in a site where the GPS signals are not strong enough to provide the positioning service. In fact, as explained above, the process of the present invention creates a localization network and makes it to grow up to the point where the apparata of the localization network can provide sufficient localization data. An apparatus like that depicted in FIG. 8 and discussed herein, with suitable software, can implement all the functionalities needed by any role in the localization network according to embodiments of the present invention.

In one example, a passive cooperator needs only, as a minimum, one Radio Transceiver 87.1, a Localization Processor 86 or a suitable software module in its CPU 82, and a working Positioning Data Module 83. In this case it is assumed that this is strictly needed, as a passive cooperator which is not able to provide positioning data would be useless in the localization network and the controller would discard it.

Finally, an inert cooperator needs only one Radio Transceiver 87 and some data about its position. An example of such a device is an RFID (Radio Frequency Identification) tag, or a NFC (Near Field Communication) tag. When such a tag is interrogated, for instance by an NFC smartphone, it responds with its identification code and through this code one can obtain data on its position from some database where we assume they are stored. The process and the apparata according to the present invention therefore advantageously enable calculation of the position of apparata in places where localization systems are not available or where localization systems are inactive or unreliable. In particular, implementation of the process according to the present invention requires that the apparata that implement the present invention simply have a radio transceiver system that enables establishing direct apparatus-to-apparatus connections and specific application software. For example, Wi-Fi P2P is perfectly suitable as a radio transceiver system and therefore, as Wi-Fi is already present in many telecommunications apparata, including many types of mobile phone terminals, the process of the present invention can be widely implemented by just adding software applications.

The process according to the present invention further enables not only calculating the position of apparata in which the process is implemented, but also the position of apparata that do not have the process of the present invention at their disposal, if these apparata that do not have this process at their disposal can connect to at least one apparatus that has the characteristics of an active cooperator, according to the present invention, and send a request to it to calculate their position. In fact, a transceiver apparatus that can establish radio connections with apparata having the characteristics of active cooperators can be included in a localization grid that can be formed by the active cooperators surrounding it. Having calculated the position and orientation of the localization grid, and in consequence the position of said transceiver apparatus, the controller apparatus sends the data on said transceiver apparatus's position to it.

Considering that a significant percentage of emergency calls are made from places not reached by localization systems, by implementing the described process in mobile phone terminals, it is possible to provide accurate data on the caller's position in situations where otherwise there would be no possibility of locating the call's point of origin, other than the rough approximation of the cell from which the call comes.

The described process also enables calculating the position of apparata using just the communication capabilities of the specific radio transceiver system of the present invention. It is therefore possible to locate any apparatus with it, without the need for either localization systems or other telecommunications systems. For example, any PC equipped with Wi-Fi P2P can determine its own position without establishing any connection with public telecommunications networks.

Finally, the process according to the present invention can be applied for calculating the relative position of a closed set of apparata even in the absence of absolute localization data, as is obvious to an expert in the art. The relative position of the apparata of this closed set can be displayed on one or more terminals equipped with display means (LCD, OLED, etc.) to offer professional services or services for civil uses, for example, of the Localization Based Service (LBS) type. In general, according to the invention, this visualization can also be applied to all cooperator apparata equipped with these display means.

The invention claimed is:

1. A cooperative localization process to calculate the absolute position of at least one apparatus to be localized and belonging to a plurality of cooperator apparata configured to cooperate, through the exchange of messages and data, in the localization of said apparatus to be localized, said cooperator apparata being equipped with at least one direct, apparatus-to-apparatus radio transmission and reception system for messages and data, and means for estimating the distance between apparata of said set of cooperator apparata, said set including at least one controller apparatus also equipped with storage and for driving a process comprising the following steps:
   a) selecting, from the set of cooperator apparata, a set of apparata, known as explorers equipped with at least one radio transceiver system configured to broadcast and receive radio signals in the areas respectively surrounding each of said explorers;
   b) instructing each of said explorer apparata to emit a search signal, said search signal being addressed to all of the apparata that can receive the search signal and containing a response request;
   c) collecting, through at least one radio transceiver system, the response messages to said search signal coming from the responding apparata that received said search signal, the responding apparata becoming cooperators, and calculating, through said distance estimation means, the distances between the cooperator apparata between which the radio links are set up for the transmission and reception of signals and messages, the set of said radio links and said cooperator apparata to which said radio links connect constituting a network known as a localization network;
   d) acquiring and processing said response messages and said distances with said storage and processing means of the controller apparatus, so as to create a representation of said localization network wherein, when one of said cooperator apparata is characterized by its absolute position, said absolute position is inserted in the related response message;
   e) checking whether the data set acquired and processed in step d) is sufficient to calculate the absolute position of said apparatus to be localized;
   f) when the check in step e) is passed, calculating the absolute position of said apparatus to be localized on the basis of said available data, and
   g) when the check in step e) fails, repeating steps a) b) c) and d), unless a further predetermined event has occurred.

2. A process according to claim 1, wherein the selection of the set of explorer apparata in step a) by said controller apparatus is made taking into account at least one of the following criteria:

whether the absolute position of the individual apparata of said localization network needs to be calculated;

coincidence of the individual cooperator apparata of said localization network with the nodes of part of said localization network, which can form a grid of adjacent triangles, known as a localization grid;

mobility of the individual apparata of said localization network and the respective speed of movement;

current configuration of said localization network;

current configuration of said localization grid;

value of said estimated distances between the apparata of said localization network;

localization data, localization means and distance estimation means that the individual apparata have;

overcome of a maximum ($H_M$) for the minimum number of said radio links to be traversed from the controller apparatus in order to reach the candidate cooperator apparatus for inclusion in said set of explorer apparata;

maximization of the extension of said localization grid contained in said localization network;

time elapsed from the previous assignment of the role of explorer compared to a predetermined threshold ($T_E$).

3. A process according to claim 1, wherein the step of calculating the position of said apparatus to be localized by the controller apparatus comprises the following steps:

h) checking whether the amount of available data is more than that necessary for calculating the position of said apparatus to be localized;

i) if the check in step h) is passed, calculating said position using an optimization algorithm that, on the basis of said available data and the respective uncertainties, calculates the position of said apparatus to be localized and calculates the uncertainties related with said position, or j) if the check in step h) fails, checking whether the amount of available data is that strictly necessary for calculating the position of the apparatus to be localized;

k) if the check in step j) is passed, calculating said position on the basis of said available data and according to the uncertainties related with said position, or l) if the check in step j) fails, carrying out the following steps:

calculating the areas of uncertainty due to lacking the minimum number of data items necessary to geometrically calculate said absolute position;

minimizing the uncertainties resulting from said lack of said available data, obtaining delimitations of the areas of uncertainty on the basis of the results of at least one of the following calculations:

i) correlation with the transmission and reception ranges of said cooperator apparata, ii) correlation with the physical and geometrical configuration of the area where the individual said apparata of said plurality are present;

calculation, on the basis of said available data and said delimitations, of the most likely position of said apparatus to be localized, as well as the uncertainties related with said position.

4. A process according to claim 1, wherein said predetermined event comprises checking at least one of the following conditions:

4a) exceeding a predetermined elapsed time limit running from the beginning of the process ($T_L$);

4b) exceeding a predetermined limit ($N_M$) on the total number of cooperator apparata comprised in said localization network.

5. A process according to claim 1, wherein said step f) of calculating the absolute position of said apparatus to be localized comprises the following steps:

m) check whether the accuracy calculated on said absolute position is greater than a predetermined threshold level;

n) if the check in step m) is passed, make said absolute position available to the apparatus that requested it, or o) if the check in step m) fails, check whether there is data in said available data to be updated (510);

p) if the check in step o) is passed, make the cooperator apparata that have provided the data that has become obsolete update said available data and then pass to the execution of step d);

q) if the check in step o) fails, check whether a predetermined event has occurred, said predetermined event comprising checking at least one of the following conditions:

4a) exceeding a predetermined limit elapsed time limit running from the beginning of the process ($T_L$);

4b) exceeding a predetermined limit ($N_M$) on the total number of cooperator apparata comprised in said localization network.

6. A process according to claim 5, wherein condition 4b) is checked and r) in the case of passing, said absolute position is made available to the apparatus that requested it, or q) in the case of failing, condition 4a) is checked and s) in the case of passing, check whether the positioning requester is interested in refining the calculations of said absolute position to be localized;

in the case of failing, pass to the execution of step a);

if the check in step s) is passed, reset, possibly upon request, the value for the predetermined limit on the time elapsed from the beginning of the process ($T_L$) and jump to step a);

if the check in step s) fails, make said absolute position available to the apparatus that requested it.

7. A process according to claim 1, further comprising the step of delimiting the uncertainties on the positions of said plurality of said cooperator apparata on the basis of the results of at least one of the following calculations:

estimation of the transmission and reception ranges between pairs of said cooperator apparata of said plurality of apparata, correlations with the physical and geometrical configuration of the area where said apparata of said plurality are present.

8. A process according to claim 1, further comprising the step where communications between a first said cooperator apparatus and a second said apparatus of said localization network take place, at least in part, by transiting through one or more of said cooperator apparata, known as relay apparata.

9. A process according to claim 8, further comprising the step of selecting said relay apparata according to one or more of the following preferential selection criteria:

number of radio links between said first apparatus and said second apparatus;

time intervals running from the times to which said characteristic data stored in said storage means refer;

time intervals running from the times to which said estimated distances stored in said storage means refer;

lengths of the radio links.

10. A process according to claim 8, further comprising, within the set of all cooperator apparata, at least one of the following types of apparatus:

apparatus known as an active cooperator, wherein the active cooperator is configured to assume said role of controller, said role of explorer and said role of relay apparatus;

passive cooperator apparatus, wherein the passive cooperator is not configured to assume said role of controller, or said role of explorer, or said role of relay apparatus, but is configured to establish radio connections with active cooperator apparata and to enable estimation of the distances from the active cooperator apparata and to directly provide an active cooperator with data on its position;

cooperator apparatus known as an inert cooperator, wherein the inert cooperator is not configured to assume said role of controller, or said role of explorer, or said role of relay apparatus, and is not configured to directly provide an active cooperator with its position, but is configured to allow at least one active cooperator to identify the cooperator classified as an inert cooperator, estimate the distance between said at least one active cooperator and said inert cooperator apparatus and indirectly acquire the position of said inert cooperator.

11. A process according to claim 1, further comprising the step of storing a data set in said storage means comprising one or more of the following data items:

indicator of whether or not it is necessary to calculate the position of the respective apparatus;

list of the parties that request localization of the respective apparatus;

addresses of the parties to whom the results of the position calculations for the respective apparatus are to be sent;

coincidence or non-coincidence of the respective apparatus with a node of said localization grid;

number of radio links that separate the respective apparatus from said controller apparatus;

mobility or immobility of the respective apparatus;

classification of the respective apparatus according to a classification of active cooperator apparatus, passive cooperator apparatus and inert cooperator apparatus;

time when the respective apparatus most recently assumed the role of explorer, type of respective apparatus (mobile phone terminal, Wi-Fi access point, cordless phone, domestic appliance, etc.);

availability of respective satellite localization systems apparatus;

availability of respective terrestrial localization systems apparatus;

availability of respective distance measurement systems apparatus.

12. A process according to claim 1, further comprising the step wherein said controller apparatus, through said processing means, updates the calculation of said absolute position on the basis of at least one of the following data items:

dimensions of the areas of uncertainty of said absolute position, which are calculated at the current state of development of said localization network;

times to which the estimates of said estimated distances, stored in said storage means, refer;

times to which the readings of said characteristic data, stored in said storage means, refer;

speed of movement, stored in said storage means, of the apparata of said localization network, the positions of which affect said calculation data of said absolute position.

13. A process according to claim 1, further comprising the step wherein said controller apparatus orders the updating of all or part of the available data at a common time to calculate said absolute position, inserting in the command message that said controller broadcasts to said apparata of said localization network assigned to updating said calculation data, a delay value separately calculated for each individual apparatus of said apparata assigned to updating, said delay value being calculated in a manner to compensate for the propagation times of the signals that carry said command message from said controller to said apparata assigned to said updating.

14. A process according to claim 13, further comprising the step wherein the relay apparata through which the messages of said update command pass, each subtract a processing time, corresponding to the transit time of said message from the receiving antenna to the transmitting antenna of the respective relay apparatus, from said delay value contained in said update messages.

15. A process according to claim 1, wherein one of said responding apparata responds to a search signal by sending its identification code, on the basis of which said explorer apparatus calculates the absolute position of said respondent by consulting a database, to which it has access, which contains an association between said identification code and said absolute position.

16. A process according to claim 1, wherein at least one of said cooperator apparata exchanges certain messages and data with a first group of apparata of said localization network with a first radio communications system and exchanges other messages and data with a second group of apparata with a second radio transceiver system, said at least one cooperator apparatus being able configured to convert messages and data received through one of said radio systems into messages and data emitted by means of the other of said radio systems.

17. A radio communication apparatus equipped with at least one system for direct, apparatus-to-apparatus radio transmission and reception of messages and data, comprising means for estimating its distance from apparata of a set of other apparata cooperating in determining the absolute position of an apparatus to be localized, processing means, and storage means, configured to act as a cooperator apparatus in a process according to claim 1.

18. A radio communication apparatus equipped with at least one radio transceiver system for exchanging messages and data with a set of cooperator apparata to which it belongs and also equipped with means for estimating its distance from other apparata, as well as processing means and storage means, configured to cooperate in determining the absolute position of at least one apparatus to be localized by performing a process comprising the following steps:

a) selecting, from the set of cooperator apparata, a set of apparata known as explorers, equipped with at least one radio transceiver system configured to broadcast and receive radio signals within the area respectively surrounding each of said explorers;

b) making each of said explorer apparata emit a search signal, said search signal being addressed to all the apparata that can receive it and containing a response request;

c) collecting, through at least one radio transceiver system, the data contained in the response messages to said search signal coming from the responding apparata that received said search signal, these thus becoming cooperators, and the distances between the cooperator apparata between which the radio links are set up for the transmission and reception of signals and messages, the set of said radio links and said cooperator apparata to which said radio links connect constituting a network known as a localization network;

d) acquiring and processing said response messages and said distances with said storage and processing means so as to create a representation of said localization network, wherein when there exists an apparatus amongst said cooperator apparata with information on its own absolute position, said absolute position is inserted in the related response message;

e) checking whether the set of available data acquired and processed in step d) is sufficient to calculate the absolute position of said apparatus to be localized;

f) when the check in step e) is passed, calculating the absolute position of said apparatus to be localized on the basis of said available data, and g) when the check in step e) fails, repeating steps a) b) c) and d), unless a further predetermined event has occurred.

19. A radio communication apparatus, equipped with at least one radio transceiver system for exchanging messages and data with a set of cooperator apparata to which it belongs and also equipped with means for estimating its distance from other apparata, configured to:

receive a search command emitted by a radio communication apparatus, known as the controller, instructing it to emit at least one search signal to check for the presence of other apparata that might be able configured to cooperate in determining said absolute position;

emit said search signal addressed to all the apparata that can receive it and containing a response request;

collect, through at least one radio transceiver system, the response messages to said search signal coming from the responding apparata that received said search signal, these thus becoming cooperators, and calculating the distances from said responding apparata by said means for estimating its distance from other apparata, said response messages including the absolute position of respondents that have this information;

transmit, by at least one radio transceiver system, the estimates of the distances from said responding apparata, as well as their received absolute positions, to said controller apparatus;

cooperate in determining the absolute position of at least one apparatus to be localized.

20. A radio communication apparatus equipped with at least one radio transceiver system for exchanging messages and data with a set of cooperator apparata to which it belongs, configured to:

receive from a first cooperator apparatus a search command emitted by a radio communication apparatus, known as the controller, instructing the emission of at least one search signal addressed to a third cooperator apparatus, known as the explorer, to check for the presence of other apparata that might be configured to cooperate in determining said absolute position;

forward said search command to a second cooperator apparatus in the direction of said explorer apparatus;

receive from said second cooperator apparatus, through at least one radio transceiver system, the messages coming from said explorer apparatus containing the responses to said search signal emitted by the responding apparata to said explorer apparatus, addressed to said controller apparatus, said response messages including the estimates of the distances from said respondents and the absolute positions of the respondents that might be known;

transmit to said first cooperator apparatus, by at least one radio transceiver system and in the direction of said controller apparatus, the estimates of the distances of said responding apparata as well as their received absolute positions;

cooperate in determining the absolute position of at least one apparatus to be localized.

21. A radio communication apparatus according to claim 20, wherein it is equipped with means for estimating its distance from other apparata and is configured to perform the following additional steps:

estimating, by said means for estimating its distance from other apparata, its distance from said first and second cooperator apparata with the messages received from said first and second cooperator apparata;

transmitting to said first cooperator apparatus, by at least one radio transceiver system and in the direction of said controller apparatus, said estimated distances between it and said first and second cooperator apparata.

22. A radio communication apparatus according to claim 17, wherein it is configured to establish some connections with a first group of apparata of said set of cooperator apparata through a radio transceiver system and establish other connections with a second group of apparata of said set of cooperator apparata through a further radio transceiver system, said radio communication apparatus being configured to convert messages received through one of said radio transmission and reception systems into messages emitted by the other of said radio transmission and reception systems.

23. A radio communication apparatus according to claim 17, wherein it is equipped with a radio transceiver system using technology known by the names "Wi-Fi Direct", "Wi-Fi Peer-to-Peer" and "Wi-Fi P2P".

24. A radio communication apparatus according to claim 17, wherein the time intervals when said radio transceiver system is not engaged in exchanging messages and data with other cooperator apparata, it enters a mode of operation in which the circuits of the receiver of the radio transceiver system are cyclically switched on for a time $T_a$ and switched off for a time $T_s$, in a repeated cycle lasting time $T_c$, where $T_c=T_a+T_s$.

* * * * *